United States Patent
Yonekubo et al.

(10) Patent No.: US 6,331,040 B1
(45) Date of Patent: Dec. 18, 2001

(54) METHOD OF DRIVING INK JET RECORDING HEAD

(75) Inventors: Shuji Yonekubo; Yasuhiko Kosugi, both of Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/147,395

(22) PCT Filed: Apr. 16, 1998

(86) PCT No.: PCT/JP98/01737

§ 371 Date: Dec. 16, 1998

§ 102(e) Date: Dec. 16, 1998

(87) PCT Pub. No.: WO98/46432

PCT Pub. Date: Oct. 22, 1998

(30) Foreign Application Priority Data

Apr. 16, 1997 (JP) .................................................. 9-099486
May 7, 1997 (JP) .................................................. 9-117332

(51) Int. Cl.[7] .............................. B41J 2/205; B41J 29/393
(52) U.S. Cl. ................................................ 347/15; 347/19
(58) Field of Search ................................ 347/15, 43, 16, 347/40, 19, 41, 10, 9, 14, 12, 11; 358/298

(56) References Cited

U.S. PATENT DOCUMENTS 4,673,951 * 6/1987 Mutoh et al. ........................ 347/15
5,285,215  2/1994 Liker .

FOREIGN PATENT DOCUMENTS 0 738 598  10/1996 (EP) .
55-17589   2/1980  (JP) .
7-205417   8/1995  (JP) .

* cited by examiner

*Primary Examiner*—John Barlow
*Assistant Examiner*—Charles W. Stewart, Jr.
(74) *Attorney, Agent, or Firm*—Oblon, Spivak, McClelland, Maier & Neustadt, P.C.

(57) ABSTRACT

An apparatus for driving an ink jet record head, in which a pressure generating element and an opening is provided for each of a plurality of nozzles so as to cause an ink droplet to spout from the opening. The apparatus includes a driving signal generation unit that generates a driving signal, which includes a first driving pulse for causing a first ink droplet to spout from a nozzle and a second driving pulse for causing a second ink droplet to spout from the nozzle that is greater in size than the first ink droplet. Also included is a dot creation unit configured to select both the first driving pulse and the second driving pulse in one recording period corresponding to the recording of one pixel so as to create a larger dot than dots formed by the first and second ink droplets, and an element driving unit that drives the pressure generating element in response to the selected driving pulses.

14 Claims, 19 Drawing Sheets

Fig. 16

| PULSE SELECTION | WEIGHT OF INK DROPLET PER RECORDING PERIOD | |
|---|---|---|
| ONLY 1ST PULSE | 5ng | (THIS EMBODIMENT) |
| ONLY 2ND PULSE | 10ng | |
| 1ST PULSE + 2ND PULSE | 20ng | (THIS EMBODIMENT) |

METHOD OF DRIVING INK JET RECORDING HEAD

BACKGROUND OF THE INVENTION

1. Field of the Invention

The present invention relates to an apparatus for and a method of driving an ink jet record head wherein ink droplets of different sizes may be spouted from each nozzle, and also to a printing apparatus with such a driving apparatus.

2. Discussion of the Background

An ink jet printer converts an image, which is to be printed, into binary codes or multi-value codes and controls the creation of dots on a recording medium by respective nozzles on a print head, based on the dot on-off signals obtained as the results of the multi-value coding. The structure of the ink jet printer causes the plurality of nozzles on the record head to respectively spout ink droplets at a predetermined timing and thereby form dots on the surface of a recording medium, such as a recording sheet of paper, so as to implement the recording. The fundamental technique for ink spouting pressurizes ink in an ink conduit, which is connected to each nozzle, for an extremely short time period and causes the pressurized ink to spout as an ink droplet from the end of the nozzle. There are several known mechanisms for generating the pressure that is applied to the ink; for example, a system that utilizes piezoelectric elements to generate the pressure and a system that takes advantage of bubbles produced by heating to apply the pressure. No matter which mechanism is applied, however, the ink jet technique can only control the spout or non-spout of ink droplets from the ends of the respective nozzles, that is, the on-off state of the dots. It is thus extremely difficult to continuously and freely regulate the weight of ink in each spouted ink droplet and record the halftone.

Several techniques have been proposed to express the halftone; for example, the area tone method, the dither method, and the error diffusion method. The area tone method, for example, expresses each pixel with a plurality of dots like 4×4 or 8×8 to record the halftone. The expression of one pixel with the 4×4 dot matrix results in the representation of the density by the gradation of 16 tones (or 17 tones including complete white). An increase in resolving power of the pixel ensures a more minute tone expression. An increase in tone without varying the diameter of the recorded dots, however, lowers the practical resolution. The larger diameter of the dots recorded on the recording paper makes the granularity undesirably conspicuous in a low density area. It is accordingly necessary to decrease the weight of each ink droplet and reduce the diameter of the recorded dots.

A known technique for spouting ink droplets of a smaller weight to reduce the dot diameter first expands and then contracts the volume of a pressure chamber connected to the ink conduit, which is generally referred to as the 'drawing shot', as described in, for example, JAPANESE PATENT LAID-OPEN GAZETTE No. 55-17589. The expansion of the volume of the pressure chamber cancaves the ink interface (meniscus) inward the nozzle and causes a smaller ink droplet to be spouted from the nozzle under pressure, thereby reducing the diameter of the recorded dots.

The smaller diameter of the recorded dots makes the granularity substantially inconspicuous in a low density area and enhances the recording quality, but significantly lowers the recording rate. By way of example, where using only the smaller diameter dots having a dot diameter about half the standard dot diameter requires approximately four times the recording time, compared with using dots of a standard dot diameter. The possible measures to prevent the lowered recording rate increase the driving frequency for spouting ink droplets by four times and increase the number of nozzles by four times. Neither of these measures is, however, easily actualized.

One proposed technique causes ink droplets of different weights to be spouted from one identical nozzle and enables the tone expression (see, for example, the specification of the U.S. Pat. No. 5,285,215). This technique generates a plurality of identical pulse signals in one recording period and thereby makes a plurality of minute ink droplets. Before reaching the recording paper, the plurality of minute ink droplets join to produce a large ink droplet.

This proposed technique controls the spout of minute ink droplets and the spout of a large ink droplet obtained by uniting the plurality of minute ink droplets. A lot of conditions, such as the distance between the nozzle end and the recording paper and the relationship between the spouting rate of the ink droplets and the driving rate of the head, must be fulfilled to securely unite the plurality of ink droplets having substantially the same size before the ink droplets reach the recording paper. Another disadvantage is a narrow variable range of the recorded dot diameter.

The object of the present invention is thus to solve the above problems and provide an apparatus for and a method of driving an ink jet record head that widens the variable range of the recorded dot diameter, as well as a printing apparatus with this recording head driving apparatus.

SUMMARY OF THE INVENTION

At least part of the above problems is solved by the present invention. The present invention is directed to an apparatus for driving an ink jet record head, wherein a pressure generating element provided corresponding to each opening of a plurality of nozzles is actuated to cause an ink droplet to be spouted from the opening of each nozzle. The apparatus includes:

a driving signal generation unit that generates a driving signal, which includes a first driving pulse for causing a first ink droplet to be spouted from the plurality of nozzles and a second driving pulse for spouting a second ink droplet that is greater in size than the first ink droplet to be spouted from the plurality of nozzles;

a driving pulse selection unit that selects at least one driving pulse from the first driving pulse and the second driving pulse in one recording period corresponding to the recording of one pixel;

an element driving unit that drives the pressure generating element in response to the driving signal including the selected driving pulse; and a larger dot creation unit that, when it is required to create a larger dot than dots formed by the first and the second ink droplets, causes the pulse selection unit to select both the first driving pulse and the second driving pulse in one recording period, so as to create the larger dot by an ink droplet corresponding to both the first and the second driving pulses on a recording medium.

The present invention is also directed to a method corresponding to the apparatus for driving the record head. The present invention accordingly provides a method of driving an ink jet record head, wherein a pressure generating element provided corresponding to each opening of a plurality of nozzles is actuated to cause an ink droplet to be spouted from the opening of each nozzle. The method includes the steps of:

generating a driving signal, which includes a first driving pulse for causing a first ink droplet to be spouted from said plurality of nozzles and a second driving pulse for spouting a second ink droplet that is greater in size than the first ink droplet to be spouted from said plurality of nozzles;

selecting at least one driving pulse from the first driving pulse and the second driving pulse in one recording period corresponding to the recording of one pixel;

when it is required to create a larger dot than dots formed by the first and the second ink droplets, selecting both the first driving pulse and the second driving pulse in one recording period; and driving said pressure generating element in response to the driving signal including the selected driving pulse.

The apparatus for and the method of driving the ink jet record head selects at least one driving pulse out of the two driving pulses, which respectively correspond to a first ink droplet and a second ink droplet having different sizes, in one recording period, and drive the pressure generating element in response to a driving signal including the selected driving pulse. This arrangement enables creation of dots by the first ink droplet formed in response to the first driving pulse, dots by the second ink droplet formed in response to the second driving pulse, and dots by the first and second ink droplets formed in response to the first and second driving pulses. The structure of the present invention utilizes at least two dots out of these three choices, in order to carry out three-value or higher-value processing, that is, no creation of dots, creation of a smaller dot, and creation of a larger dot.

In accordance with one preferable application of the apparatus for and the method of driving the ink jet record head, a pressure chamber having a volume reduced by deformation of said pressure generating element to increase a liquid pressure of ink is disposed in connection with an ink conduit that is connected to with said each nozzle. In this application, the driving signal is specified and controlled in the following manner. The second driving pulse is generated to include at least a first signal for expanding said pressure chamber, a second signal for keeping the expanded state of said pressure chamber, and a third signal for contracting said pressure chamber. A time difference between the time of spouting the first ink droplet and a start timing of the first signal of the second driving pulse is set to be longer than a recovery time TR of a meniscus after the spout of the first ink droplet and shorter than TR+3·Tm/8 (where Tm denotes a period of a natural vibration of the meniscus). This arrangement takes advantage of the movement of ink due to the recovery of the meniscus after the spout of the first ink droplet and thereby facilitates formation of a second ink droplet having a greater size.

The ease of the spout of ink is affected by a variety of properties of the ink. For example, the higher viscosity of the ink decreases the ease of the spout and causes the formation of a smaller ink droplet in response to the same driving signal. The ease of the spout of ink is affected by the viscosity of the ink or the temperature of the ink, which is strongly correlated with the viscosity. If the start timing of the first signal of the second driving pulse is fixed, there is accordingly a possibility of forming an ink droplet of an undesired sized according to the viscosity of the ink. One preferable structure thus detects the viscosity of ink or an arbitrary parameter reflecting the viscosity (for example, the temperature of ink), and changes the time difference between the time of spouting the first ink droplet and the start timing of the first signal by varying the start timing of the first signal based on the detected parameter.

The viscosity of the ink generally decreases with an increase in temperature. It is accordingly preferable that the time difference between the time of spouting the first ink droplet and the start timing of the first signal of the second driving pulse is extended as the observed temperature increases. This arrangement enables the size of the second ink droplet to be kept at substantially the same level, irrespective of the temperature of the ink.

The above arrangement takes into account the large movement of the ink due to a vibration of the meniscus at a natural frequency after the interface (meniscus) at the end of the ink is once concaved significantly and then returned to the original position. The minute observation of the ink movement clarifies that there is a vibration of the Helmholtz resonance depending upon the rigidity and the shape of the ink conduit and the pressure chamber. It is accordingly effective to generate the driving signal by taking into account the period of the Helmholtz resonance vibration. In this case, a pressure chamber having a volume reduced by the deformation of said pressure generating element to increase the liquid pressure of ink is disposed in connection with an ink conduit that is connected to said each nozzle. The time difference between the time of spouting the first ink droplet and the time of spouting the second ink droplet is set by taking into account a period Tc of the Helmholtz resonance vibration of the ink in said pressure chamber.

Determining the timing of formation of the second ink droplet by taking into account the natural vibration of the ink in the ink conduit enables the minute regulation of the size of the second ink droplet. It is also preferable to carry out such regulation in combination with the control taking into account the recovery time of the meniscus discussed above.

By taking into account the natural frequency, the time difference between the time of spouting the first ink droplet and the time of spouting the second ink droplet may, for example, be set equal to an integral multiple of the period Tc of the Helmholtz resonance vibration of the ink in the pressure chamber. The integral multiple of the period Tc utilizes the natural vibration and increases the weight of the second ink droplet.

The ease of the spout of ink is varied with a variation in property of the ink, such as the temperature. The technique of increasing the amount of ink spouted by taking into account the period of the Helmholtz resonance vibration may, however, result in an undesired amount of ink. Another preferable structure thus detects a parameter reflecting the ease of the spout of ink, for example, the viscosity of ink (or the temperature of ink reflecting the viscosity), and varies the time difference between the time of spouting the first ink droplet and the time of spouting the second ink droplet to (an integer+½) times the period Tc of the Helmholtz resonance vibration based on the parameter, as the ease of the spout of ink increases. This arrangement also enables the weight of the ink droplet to be kept at substantially the same level when the property of the ink varies to increase the ease of the spout.

The present invention is further directed to a printing apparatus that applies the apparatus for or the method of driving the ink jet record head. Namely, the present invention provides a printing apparatus having an ink jet record head, wherein a pressure generating element provided corresponding to each opening of a plurality of nozzles is actuated to cause an ink droplet to be spouted from the opening of each nozzle, said printing apparatus recording an image on a recording medium with ink droplets spouted from said plurality of nozzles. The printing apparatus includes:

a print data input unit that inputs print data having a tone value for each pixel included in the image;

a driving signal generation unit that generates a driving signal, which includes a first driving pulse for causing a first ink droplet to be spouted from said plurality of nozzles and a second driving pulse for spouting a second ink droplet that is greater in size than the first ink droplet to be spouted from said plurality of nozzles;

a driving pulse selection unit that determines whether neither the first driving pulse nor the second driving pulse is selected not to spout any ink droplet, only either one of the first driving pulse and the second driving pulse is selected, or both the first driving pulse and the second driving pulse is selected, in one recording period corresponding to recording of one pixel, based on the tone value of the input print data; and an element driving unit that drives said pressure generating element in response to the driving signal including the selected driving pulse.

The printing apparatus selects at least one driving pulse from the two driving pulses, which respectively correspond to a first ink droplet and a second ink droplet having different sizes, in one recording period based on the tone value of the input print data, and drives the pressure generating element in response to a driving signal including the selected driving pulse. This arrangement enables creation of dots by the first ink droplet formed in response to the first driving pulse, dots by the second ink droplet formed in response to the second driving pulse, and dots by the first and second ink droplets formed in response to the first and second driving pulses. The structure of the present invention utilizes at least two dots out of these three choices, in order to carry out three-value or higher-value processing, that is, no creation of dots, creation of a smaller dot, and creation of a larger dot. This ensures and facilitates creation of the dots by the smaller ink droplet as well as the dots by the larger ink droplet, and significantly improves the quality of the resulting image without lowering the printing speed.

In this printing apparatus, it is preferable to specify the relationship between the first pulse signal and the second pulse signal by taking into account the recovery time TR of the meniscus, the period Tm of the natural vibration of the meniscus, and the natural frequency Tc of the ink in the ink conduit.

BRIEF DESCRIPTION OF THE DRAWINGS

FIG. 16 shows the relationship between the pulse selection and the weight of an ink droplet per one recording period;

DETAILED DESCRIPTION OF THE PREFERRED EMBODIMENTS

Some modes for carrying out the present invention are described below as preferred embodiments.

A. Schematic Structure of Printing Apparatus

Figure 2:
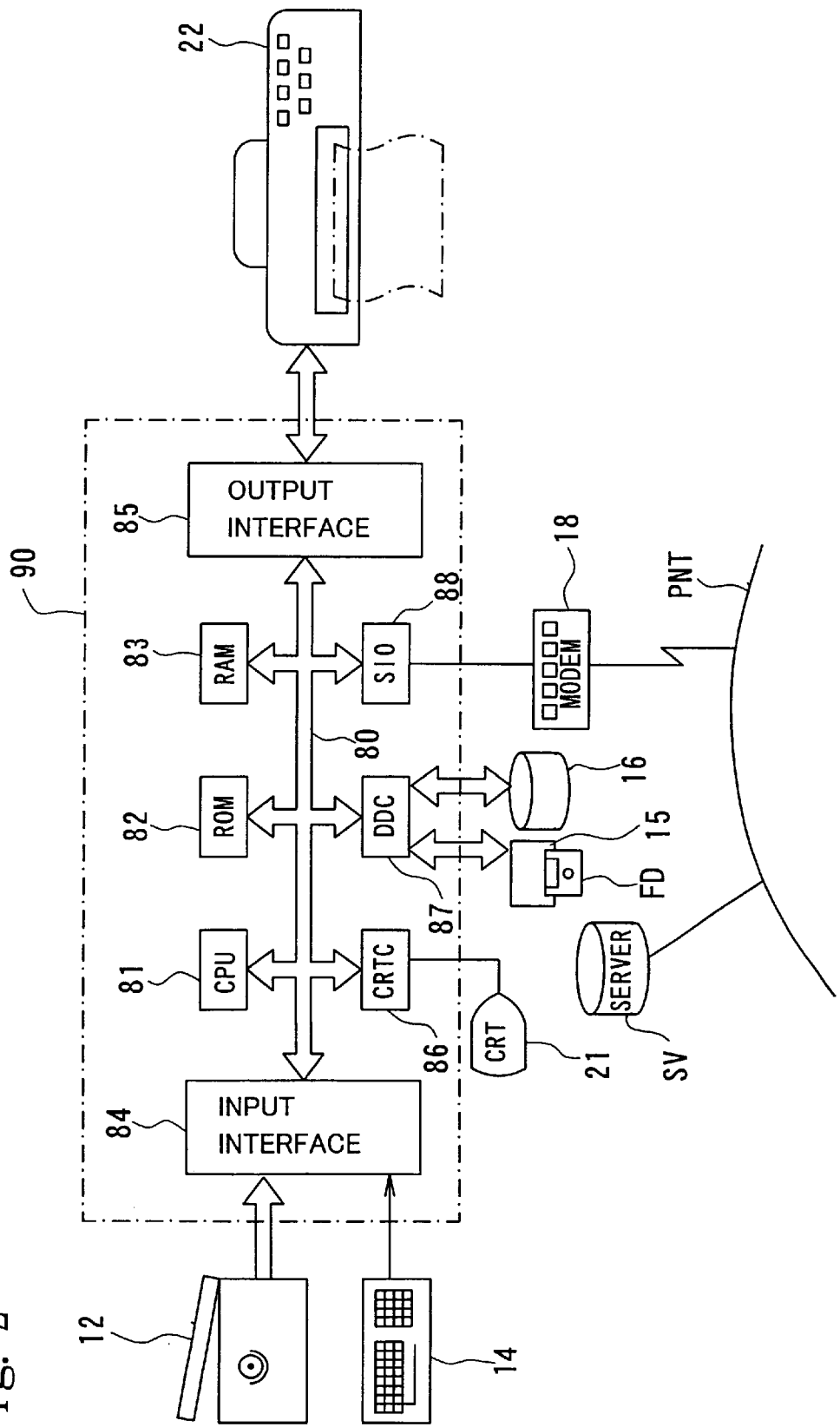
FIG. 2 schematically illustrates the structure of a printing apparatus embodying the present invention.

For convenience of explanation, the general structure of a printing apparatus is described first. FIG. 2 is a block diagram illustrating the structure of a printing apparatus embodying the present invention. As illustrated, a computer 90 is connected with a scanner 12 and a color printer 22, and loads and executes predetermined programs to function as the printing apparatus as a whole. The computer 90 includes a CPU 81 that carries out a variety of operations to control the respective processes relating to the image processing according to the programs, as well as the following constituents that are mutually connected via a bus 80. A variety of programs and data required for the CPU 81 to execute the variety of operations are stored in advance in a ROM 82, whereas a variety of programs and data required for the CPU 81 to execute the variety of operations are temporarily written in and read from a RAM 83. An input interface 84 is in charge of input of signals from the scanner 12 and a keyboard 14, whereas an output interface 85 is in charge of output of data to the printer 22. A CRTC 86 controls the output of signals to a CRT 21 for color display, and a disk controller (DDC) 87 controls the transmission of data to and from a hard disk 16, a flexible disk drive 15, and a non-illustrated CD-ROM drive. The variety of programs loaded into the RAM 83 and executed as well as a variety of programs provided in the form of a device driver are stored in the hard disk 16.

A serial input-output interface (SIO) 88 is further connected to the bus 80. The SIO 88 is linked with a modem 18 and connected to a public telephone network PNT via the modem 18. The computer 90 is linked with the external network via the SIO 88 and the modem 18 and may access a specific server SV in order to download the programs required for the image processing into the hard disk 16. In accordance with another application, the computer 90 loads the required programs from a flexible disk FD or a CD-ROM and executes the loaded programs.

Figure 3:
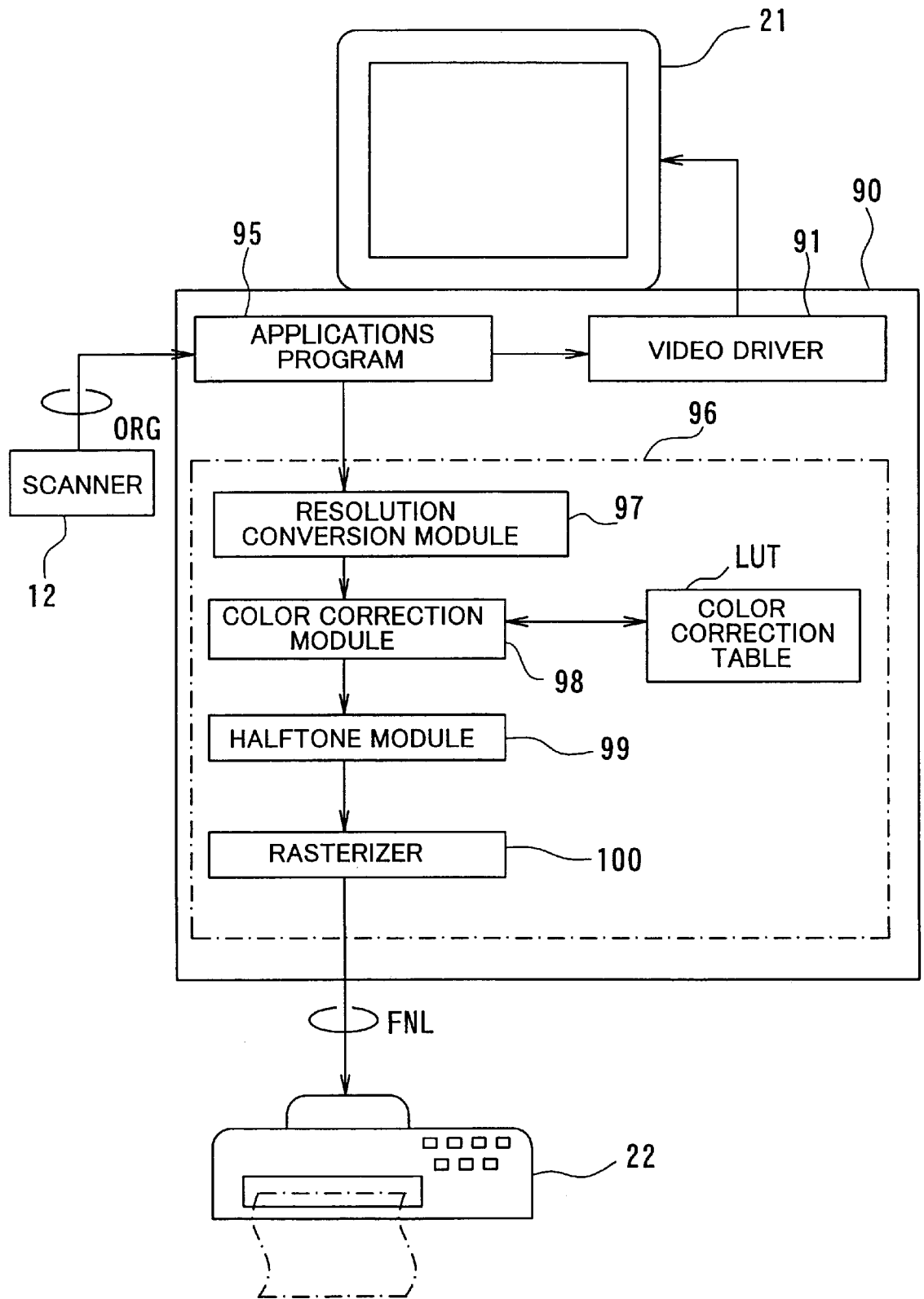
FIG. 3 is a block diagram showing the structure of a printer driver.

FIG. 3 is a block diagram illustrating the software structure of the printing apparatus. In the computer 90, an applications program 95 runs under a predetermined operating system. A video driver 91 and a printer driver 96 are incorporated in the operating system, and intermediate image data MID are output from the applications program 95 via these drivers 91 and 96 and transferred to the printer 22. The applications program 95 reads an image with the scanner 12, causes the input image to undergo a predetermined processing operation, for example, retouch of the image, and displays a processed image on the CRT display 21 via the video driver 91. The scanner 12 reads original color image data ORG from a color original and supplies the original color image data ORG, which consists of three color components, red (R), green (G), and blue (B), to the computer 90.

When the applications program 95 outputs a printing instruction, the printer driver 96 in the computer 90 receives image information from the applications program 95 and converts the input image information into signals processible by the printer 22 (multi-valued signals for the respective colors, cyan, magenta, yellow, and black). In the example of FIG. 3, the printer driver 96 includes a resolution conversion module 97, a color correction module 98, a color correction table LUT, a halftone module 99, and a rasterizer 100.

The resolution conversion module 97 converts the resolution, that is, the number of pixels per unit length, of the color image data processed by the applications program 95 into the resolution processible by the printer driver 96. Here the image data having the converted resolution is still the image information consisting of the three color components R, G, and B. The color correction module 98 then refers to the color correction table LUT and converts the image data of each pixel into data of the respective colors, cyan (C), magenta (M), yellow (Y), and black (K) used by the printer 22. The color corrected data has tone values, for example, in the range of 256 tones. The halftone module 99 creates dots in a dispersing manner and carries out the halftone processing in order to enable the printer 22 to express the tone values. In this embodiment, since the printer 22 has the capability of three-value expression, that is, no creation of dots, creation of a small dot, and creation of a large dot, with respect to each pixel as discussed later, the halftone module 99 carries out the three-value processing. The rasterizer 100 rearranges the processed image data in a sequence of data transfer to the printer 22 and outputs the rearranged image data as final image data FNL. In this embodiment, the printer 22 only creates dots based on the image data FNL and does not carry out the image processing. The printer driver 96 of the computer 90 does not regulate a piezoelectric element-driving signal, which will be described later, in the printer 22. In accordance with another possible application, however, the printer driver 96 may set a plurality of pulse signals included in the piezoelectric element-driving signal by taking advantage of the two-way communications with the printer 22.

B. Schematic Structure of Printer

Figure 4:
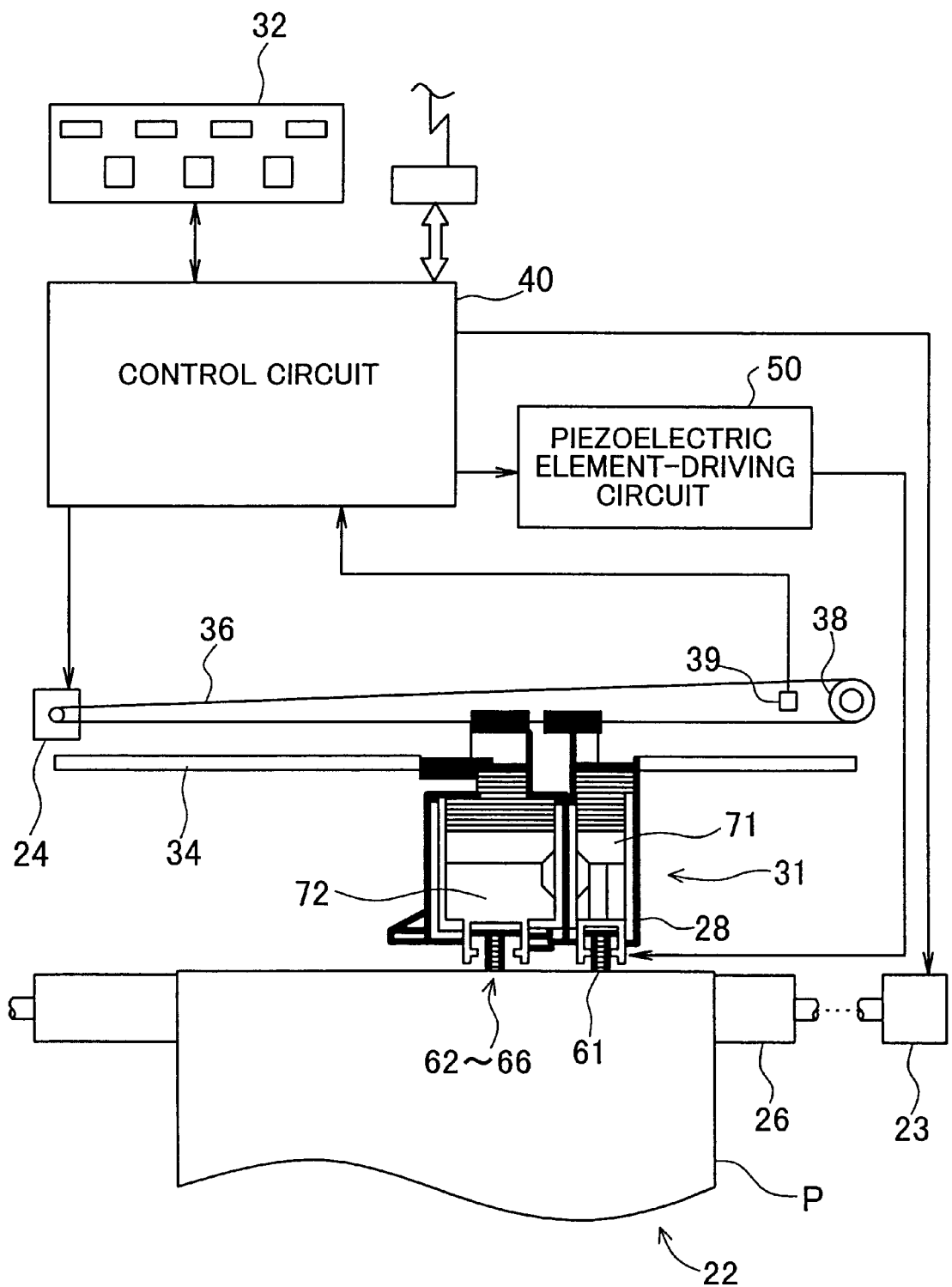
FIG. 4 illustrates the internal structure of a printer 22, especially a driving system thereof.

As shown in FIG. 4, the printer 22 has a mechanism for feeding a sheet of paper P by means of a sheet feed motor 23, a mechanism for reciprocating a carriage 31 along the axis of a platen 26 by means of a carriage motor 24, a mechanism for driving a print head 28 mounted on the carriage 31 to control the spout of ink and creation of dots, a control circuit 40 for transmitting signals to and from the sheet feed motor 23, the carriage motor 24, the print head 28, and a control panel 32, and a piezoelectric element-driving circuit 50 for generating a driving signal to drive a piezoelectric element in response to the signal from the control circuit 40.

The mechanism for reciprocating the carriage 31 along the axis of the platen 26 includes a sliding shaft 34 arranged in parallel with the axis of the platen 26 for slidably supporting the carriage 31, a pulley 38, an endless drive belt 36 spanned between the carriage motor 24 and the pulley 38, and a position sensor 39 that detects the position of the origin of the carriage 31.

A black ink cartridge 71 for black ink (Bk) and a color ink cartridge 72 in which five color inks, that is, cyan (C1), light cyan (C2), magenta (M1), light magenta (M2), and yellow (Y), are accommodated may be mounted on the carriage 31. Both the higher-density ink and the lower-density ink are provided for the two colors, cyan and magenta. A total of six ink spout heads 61 through 66 are formed on the print head 28 that is disposed in the lower portion of the carriage 31, and ink supply conduits 67 (see FIG. 5) are formed in the bottom portion of the carriage 31 for leading supplies of inks from ink tanks to the respective ink spout heads 61 through 66. When the black ink (Bk) cartridge 71 and the color ink cartridge 72 are attached downward to the carriage 31, the ink supply conduits 67 are inserted into connection apertures formed in the respective cartridges. This enables supplies of inks to be fed from the respective ink cartridges to the ink spout heads 61 through 66.

Figure 8:
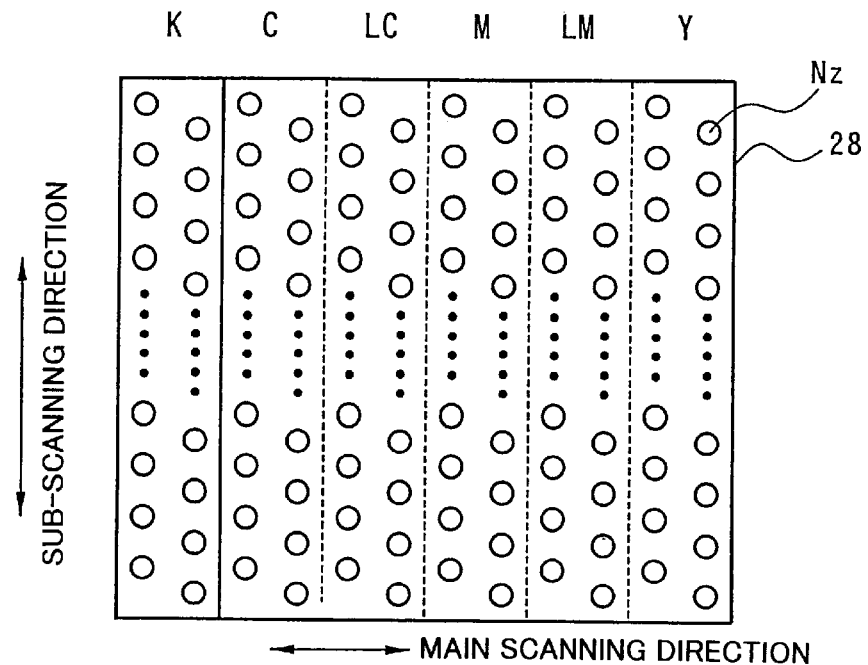
FIG. 8 shows an exemplified arrangement of nozzles in the print head 28 of the embodiment.

FIG. 8 shows an arrangement of ink jet nozzles Nz in the ink spout heads 61 through 66. The nozzle arrangement includes six nozzle arrays, wherein each nozzle array spouts ink of each color and includes forty-eight nozzles Nz arranged in zigzag at a fixed nozzle pitch k. The positions of the nozzles in the sub-scanning direction are identical in the respective nozzle arrays. The forty-eight nozzles Nz included in each nozzle array may be arranged in alignment, instead of in zigzag. The zigzag arrangement shown in FIG. 8, however, allows a small value to be set to the nozzle pitch k in the manufacturing process.

Figure 10:
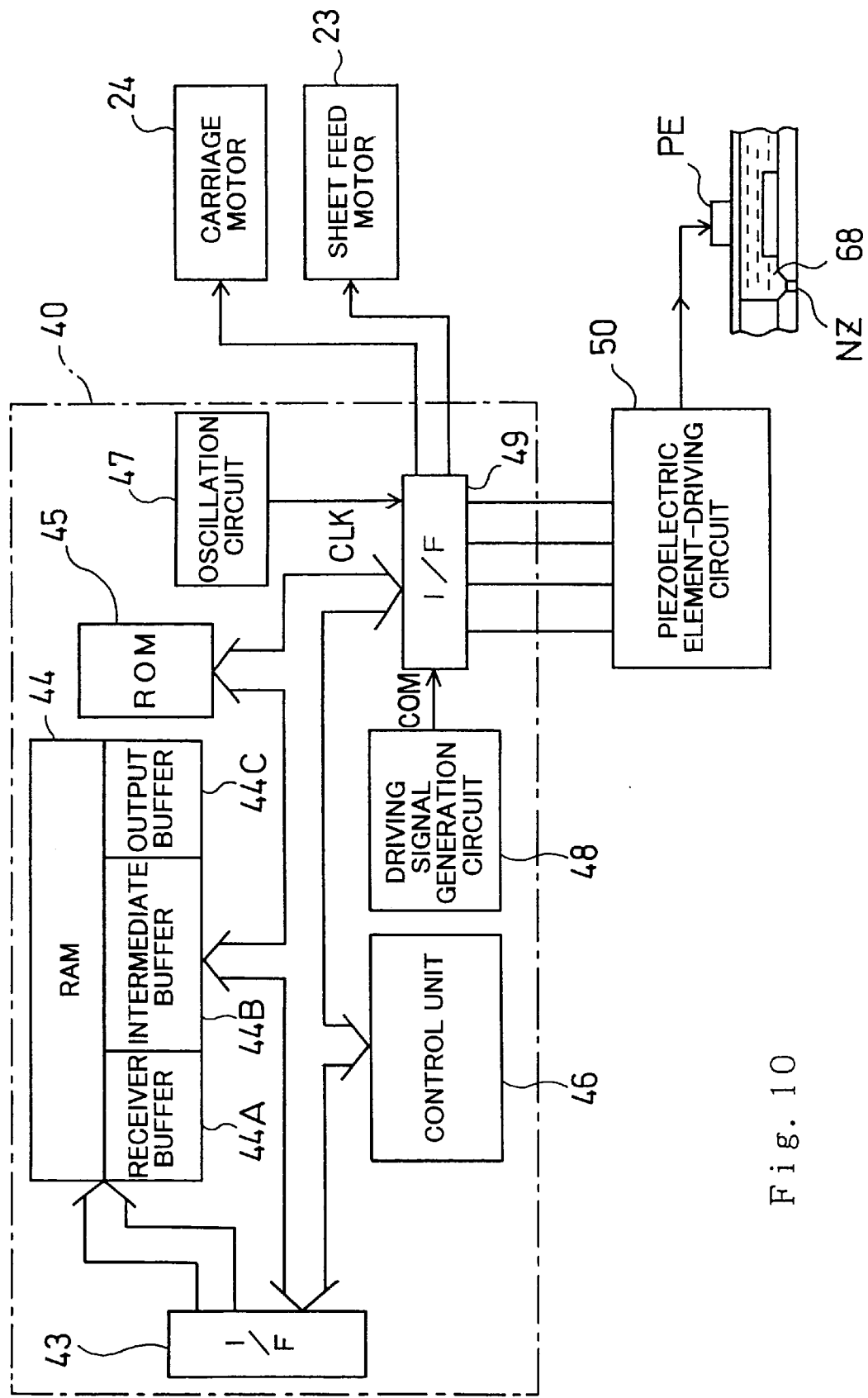
FIG. 10 is a block diagram illustrating the electrical structure of the printer 22 used in the first embodiment of the present invention.

The spout of ink from each nozzle Nz is controlled by the control circuit 40 and the piezoelectric element-driving circuit 50. FIG. 10 shows the internal structure of the control circuit 40. As illustrated, the control circuit 40 includes an interface (hereinafter referred to as the 'I/F') 43 for receiving print data including multi-valued tone information from the computer 90, a RAM 44, in which a variety of data are stored, a ROM 45, in which routines for a variety of data processing operations are stored, a control unit 46 including a CPU, an oscillation circuit 47, a driving signal generation circuit 48 functioning as the 'driving signal generation unit' that generates a driving signal to each piezoelectric element of the print head 28 discussed later, and an I/F 49 for transmitting the print data converted into dot pattern data and driving signals to the sheet feed motor 23, the carriage motor 24, and the piezoelectric element-driving circuit 50.

In this embodiment, the computer 90 transmits the print data which has undergone the three-value processing by the printer driver 96. The control circuit 40 thus stores this print data in a receiver buffer 44A, unfolds the input data in an output buffer 44C according to the arrangement of the nozzle array in the print head, and outputs the unfolded data via the I/F 49. In the case where the data transmitted from the computer 90 is print data including the multi-valued tone information (for example, data written in PostScript), on the other hand, the printer 22 carries out the three-value processing in the control circuit 40. In this case, the print data is stored in the receiver buffer 44A in the recording apparatus via the I/F 43. The record data stored in the receiver buffer 44A undergoes command analysis and is transferred to an intermediate buffer 44B. The intermediate buffer 44B stores the record data converted into intermediate codes by the control unit 46, while the control unit 46 performs the processes of adding the printing position of each character, the type of modification, the size, and the font address. The control unit 46 analyzes the record data stored in the intermediate buffer 44B, carries out the three-value processing according to the tone information, and unfolds and stores the resulting dot pattern data in the output buffer 44C.

In any case, the three-valued dot patterns are unfolded and stored in the output buffer 44C. As described later, the print head having the forty-eight nozzles for each color provides dot pattern data corresponding to one scan of the head in the output buffer 44C and outputs the dot pattern data via the I/F 49. The print data converted into the dot pattern data is, for example, 2-bit tone data for each nozzle; '00' represents no creation of dots, '10' creation of a small dot, and '11' creation of a large dot. The data structure and the process of creating dots will be discussed later.

C. Ink Spouting Mechanism

Figure 5:
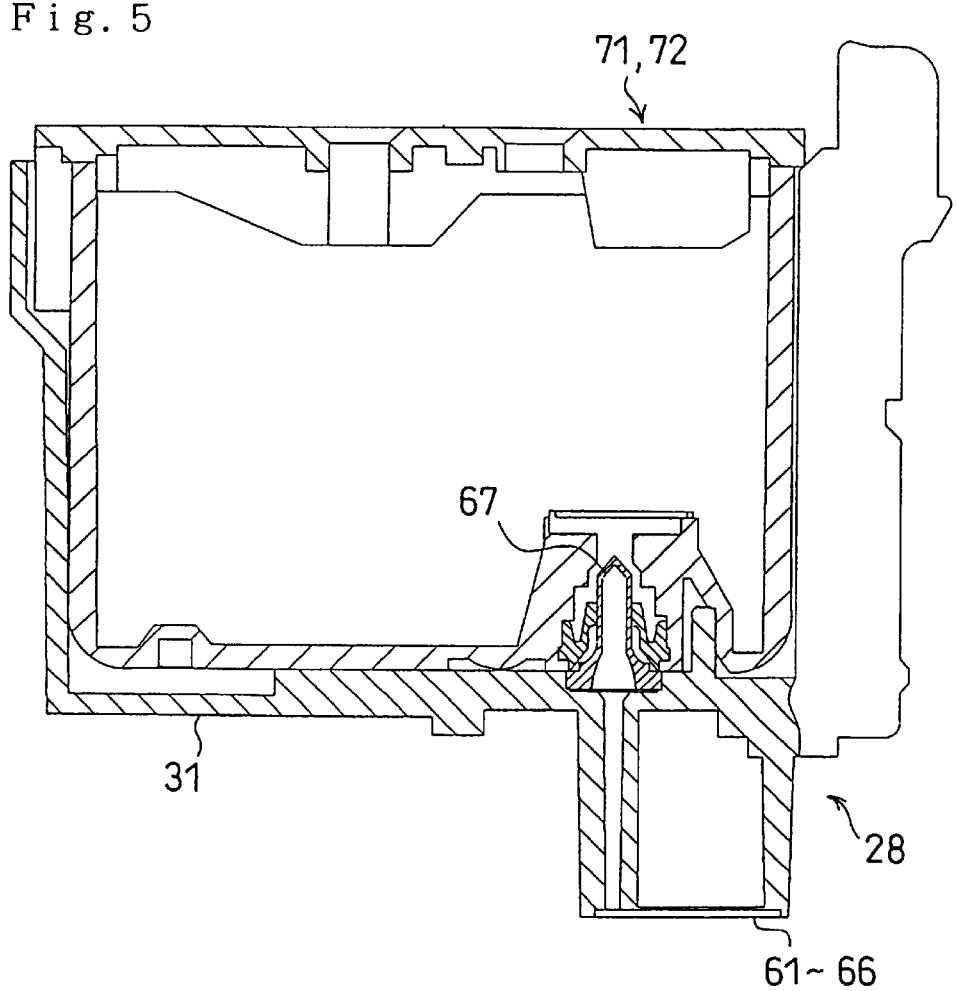
FIG. 5 schematically illustrates the structure of the print head including an ink supply conduit 67.
Figure 6:
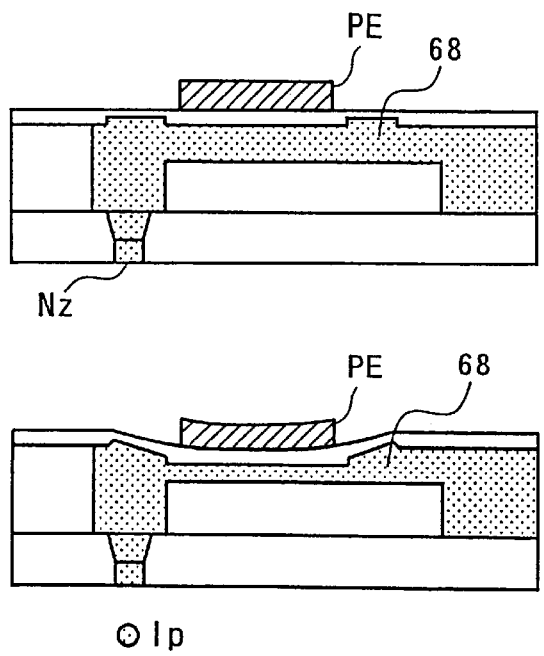
FIG. 6 shows the principle of spouting an ink droplet through expansion and contraction of the piezoelectric element.

The following describes the mechanism of spouting ink and creating dots. FIG. 5 schematically illustrates the internal structure of the print head 28, and FIG. 6 shows the process of spouting ink through expansion and contraction of a piezoelectric element PE. When the ink cartridges 71 and 72 are attached to the carriage 31, supplies of inks in the ink cartridges 71 and 72 are sucked out by capillary action through the ink supply conduits 67 and are led to the ink spout heads 61 through 66 formed in the print head 28 arranged in the lower portion of the carriage 31 as shown in FIG. 5. When the ink cartridges 71 and 72 are attached to the carriage 31 for the first time, an exclusive pump works to suck first supplies of inks into the respective ink spout heads 61 through 66. In this embodiment, structures of the pump for suction and a cap for covering the print head 28 during the suction are not illustrated nor described specifically.

An array of forty-eight nozzles Nz (see FIG. 8) is formed in each of the ink spout heads 61 through 66 as discussed later. The piezoelectric element PE, which is an electrically distorting element and has an excellent response, is arranged as the pressure generating element for each nozzle Nz. As shown in the upper drawing of FIG. 6, the piezoelectric element PE is disposed at a position that comes into contact with an ink conduit 68 for leading ink to the nozzle Nz. As is known, the piezoelectric element PE has a crystal structure that is subjected to mechanical stress due to the application of a voltage and thereby carries out extremely high-speed conversion of electrical energy to mechanical energy. In this embodiment, the application of a voltage between electrodes on the respective ends of the piezoelectric element PE for a predetermined time period causes the piezoelectric element PE to contract for the predetermined time period and deform one side wall of the ink conduit 68 as shown in the lower drawing of FIG. 6. The volume of the ink conduit 68 is reduced with the contraction of the piezoelectric element PE, and a certain amount of ink corresponding to the reduced volume is sprayed as an ink particle Ip from the end of the nozzle Nz at a high speed. The ink particles Ip soak into the sheet of paper P set on the platen 26, so as to implement printing.

Figure 7:
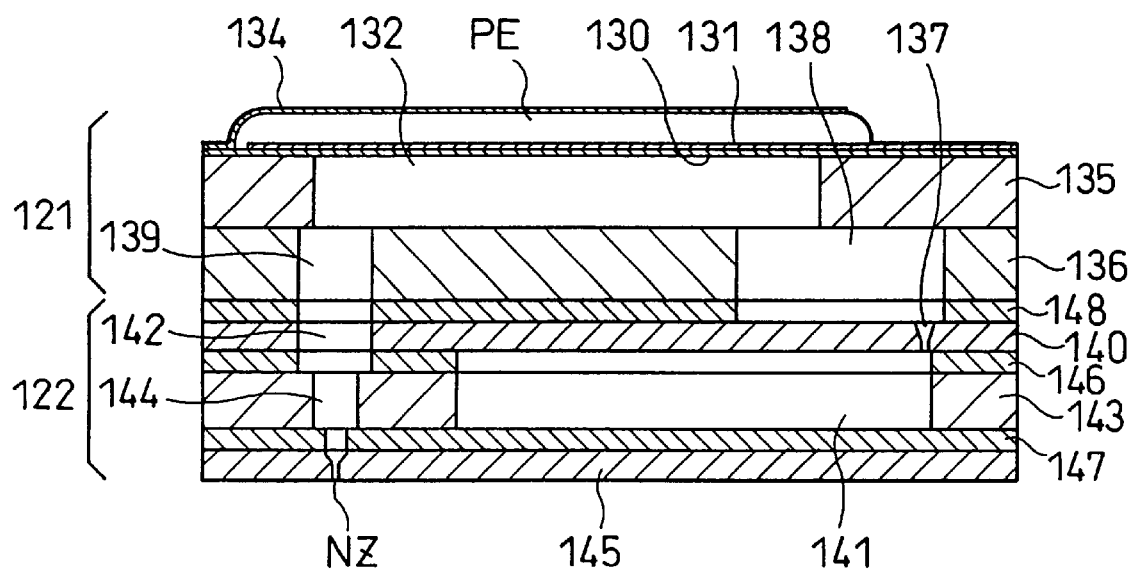
FIG. 7 is a cross section view illustrating the mechanical structure of the ink spouting mechanism disposed in the head

Based on this principle discussed with the schematic diagram, ink droplets are spouted by means of the piezoelectric elements. The details of an actual mechanism for spouting ink with the piezoelectric element PE are shown in FIG. 7. FIG. 7 is a sectional view illustrating an exemplified sectional mechanical structure of the record heads 61 through 66. As illustrated, this head mainly includes an actuator unit 121 and a flow path unit 122. The actuator unit 121 has the piezoelectric element PE, a first cover member 130, a second cover member 136, and a spacer 135. The first cover member 130 is composed of a thin zirconia plate having the thickness of about 6 μm and has a common electrode 131 formed on the surface thereof to work as one pole. The piezoelectric element PE is fixed on the surface of the common electrode 131 to face a pressure chamber 132 described below. A driving electrode 134, which is composed of a layer of relatively soft metal, such as Au, is further formed on the surface of the piezoelectric element PE.

The piezoelectric element PE is coupled with the first cover member 130 to constitute an actuator of a flexible vibration type. The piezoelectric element PE contracts under the application of electric charges and deforms in the direction to reduce the volume of the pressure chamber 132. The piezoelectric element PE expands under the discharge of electric charges and deforms in the direction to recover the volume of the pressure chamber 132.

The spacer 135 arranged below the first cover member 130 is provided by piercing a through hole in a ceramic plate like zirconia ($ZrO_2$) having a thickness suitable to form the pressure chamber 132, for example, 100 μm. The second cover member 136 and the first cover member 130 seal both sides of the spacer 135 to define the pressure chamber 132.

The second cover member 136 fixed to the other end of the spacer 135 is composed of the ceramic material, such as zirconia, like the spacer 135. The second cover member 136 has two connection apertures 138 and 139 that are connected to the pressure chamber 132 to define ink flow paths. The connection aperture 138 connects an ink supply inlet 137, which will be discussed later, with one end of the pressure chamber 132. The connection aperture 139 connects the nozzle opening Nz with the other end of the pressure chamber 132.

These members 130, 135, and 136 are joined to form the actuator unit 121 without using an adhesive, by forming the clay ceramic material into predetermined shapes, laying one upon another to construct a laminate structure, and firing the laminate structure.

The flow path unit 122 has an ink supply inlet-defining base plate 140, an ink chamber-defining base plate 143, and a nozzle plate 145. The ink supply inlet-defining base plate 140 also functions as a fixing base plate of the actuator unit 121. The ink supply inlet 137 is arranged on one end of the pressure chamber 132, whereas the nozzle opening Nz is arranged on the other end of the pressure chamber 132. The ink supply inlet 137 is a connection path that connects an ink chamber 141, which is common to the respective nozzles, with the pressure chamber 132. The ink supply inlet 137 has a sectional area that is sufficiently smaller than that of the connection aperture 138 and is designed to function as an orifice.

The ink chamber-defining base plate 143 has the other face sealed by the nozzle plate 145, and is coupled with the ink supply inlet-defining base plate 140 to define the ink chamber 141. The ink chamber-defining base plate 143 has a nozzle connection aperture 144 that connects with the nozzle opening 123. The ink chamber 141 is connected to a non-illustrated ink conduit, which communicates with the ink cartridges 71 and 72, in order to receive a flow of ink from a non-illustrated ink tank.

The ink supply inlet-defining base plate 140, the ink chamber-defining base plate 143, and the nozzle plate 145 are joined together via adhesive layers 146 and 147, such as a thermal welding film or an adhesive, so as to construct the flow path unit 122 as a whole.

The flow path unit 122 and the actuator unit 121 are fixed to each other via an adhesive layer 148, such as a thermal welding film or an adhesive, so as to construct each of the record heads 61 through 66.

When a voltage is applied between the driving electrodes 131 and 134 of the piezoelectric element PE to apply electric charges, the piezoelectric element PE contracts to reduce the volume of the pressure chamber 132. When electric charges are discharged, on the other hand, the piezoelectric element PE expands to increase the volume of the pressure chamber 132. The expansion of the pressure chamber 132 lowers the inner pressure of the pressure chamber 132 and allows a flow of ink to be flown from the common ink chamber 141 into the pressure chamber 132. Application of the electric charges to the piezoelectric element PE reduces the volume of the pressure chamber 132, so that the inner pressure of the pressure chamber 132 increases within a short time period and causes ink in the pressure chamber 132 to be spouted outside as the ink droplet Ip via the nozzle opening Nz.

In the print head 28 for ink jet recording thus constructed, the ink that is present in the flow path connected to the nozzle Nz vibrates as the fluid with a variation in inner pressure of the pressure chamber 132. This vibration of the ink includes at least two natural vibrations. One vibration has a relatively long period caused by recovery of the ink interface or the meniscus after the spout of an ink droplet. This is called a natural vibration (period Tm). The other vibration is called Helmholtz resonance occurring in the fluid due to the presence of the pressure chamber 132. This vibration has a relatively short period (period Tc), compared with the natural vibration. A Helmholtz resonance frequency f of the pressure chamber 132 is expressed by Equation (1) given below:

$$F = 1/(2\pi) \times \sqrt{\{(Mn+Ms)/(Mn \times Ms)/(Ci+Cv)\}} \quad (1)$$

where Ci denotes the fluid compliance due to the compressing property of the ink in the pressure chamber 132, Cv denotes the rigidity compliance due to the materials of the first cover member 130 defining the pressure chamber 132 and of the piezoelectric element PE, Mn denotes the inertance of the nozzle opening 123, and Ms denotes the inertance of the ink supply inlet 137.

On the assumption that the viscosity resistance of the ink conduit is neglected, the period Tm of the natural vibration is expressed by Equation (2) given below:

$$Tm = 2\pi \times \sqrt{\{(Mn+Ms)Cn\}} \quad (2)$$

where Cn denotes the compliance of the meniscus.

The fluid compliance Ci is expressed by Equation (3) given below:

$$Ci = V/\rho c^2 \quad (3)$$

where V denotes the volume of the pressure chamber 132, ρ denotes the density of the ink, and c denotes the speed of sound in the ink.

The rigidity compliance Cv of the pressure chamber 132 coincides with a static deformation ratio of the pressure chamber 132 under the application of a unit pressure to the pressure chamber 132. The rigidity compliance Cv is obtained by measuring the static deformation ratio.

The period Tc of the natural vibration excited on the meniscus by the compression or expansion of the piezoelectric element PE is identical with the period obtained as the reciprocal of the Helmholtz resonance frequency f. In an example of calculation according to the embodiment, the Helmholtz resonance frequency f is equal to 125 kHz and its period Tc is equal to 8 μs when the fluid compliance Ci is $1 \times 10^{-20}$ m$^5$N$^{-1}$, the rigidity compliance Cv is $1.5 \times 10^{-20}$ m$^5$N$^{-1}$, the inertance Mn is $2 \times 10^8$ kgm$^{-4}$, and the inertance Ms is $1 \times 10^8$ kgm$^{-4}$.

D. Outline of Creation of Large and Small Dots

Figure 9:
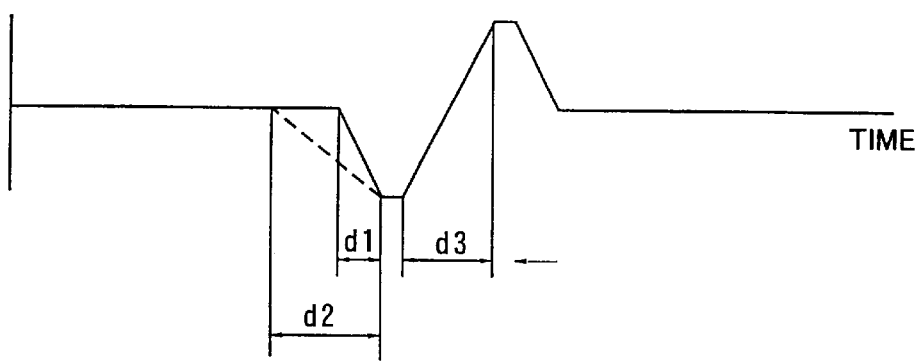
FIG. 9 shows the relationship between the driving signal supplied to the piezoelectric element and the spout of an ink droplet.
Figure 9:
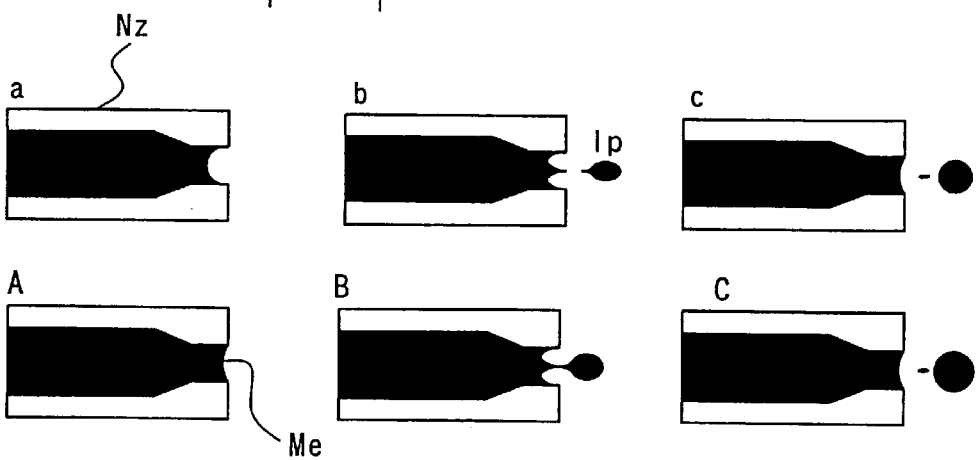

The forty-eight nozzles Nz with respect to each color arranged in the printer 22 of this embodiment have an identical inner diameter. Two types of dots having different diameters can be created with these nozzles Nz. The following describes the principle of such dot creation. FIG. 9 schematically shows the relationship between the driving waveform of the nozzle Nz and the size of the ink particle Ip spouted from the nozzle Nz. The driving waveform shown by the broken line in FIG. 9 is used to create standard-sized dots. Application of a negative voltage to the piezoelectric element PE in a division d2 deforms the piezoelectric element PE in the direction to increase the volume of the pressure chamber 132. As shown in a state A of FIG. 9, a meniscus Me is slightly concaved inward the nozzle Nz. When the driving waveform shown by the solid line in FIG. 9 is used to abruptly apply a negative voltage in the division d2, the meniscus Me is more significantly concaved inward as shown in a state a, compared with the state A.

The shape of the meniscus is varied according to the pulse waveform of the negative voltage applied to the piezoelectric element PE, because of the following reason. The piezoelectric element is deformed according to the pulse waveform of the applied voltage to vary the volume of the pressure chamber 132. In the case where the volume of the pressure chamber 132 is increased very slowly, the ink is fed from the common ink chamber 141 with the slow increase in volume of the pressure chamber 132, so that the meniscus is not significantly changed. In the case where the piezoelectric element PE is expanded or contracted within a short time period and the volume of the pressure chamber 132 is abruptly changed, on the other hand, a sufficient supply of the ink can not be fed from the ink chamber 141 because of the restriction of the ink supply inlet 137, so that the meniscus is significantly affected by the variation in volume of the pressure chamber 132. The smaller concave of the meniscus in the case of the gentle variation in voltage applied to the piezoelectric element PE (see the broken-line curve in FIG. 9) and the greater concave of the meniscus in the case of the abrupt variation in applied voltage (see the solid-line curve in FIG. 9) are ascribed to the balance of such ink supply.

Application of a positive voltage to the piezoelectric element PE in the state of the concave meniscus (a division d3) causes the ink to be spouted, based on the principle discussed previously with FIG. 6. Under the condition that the meniscus has been only slightly concaved inward (the state A), a large ink droplet is spouted as shown in states B and C. Under the condition that the meniscus has been significantly concaved inward (the state a), on the other hand, a small ink droplet is spouted as shown in states b and c.

As described above, the dot diameter is varied according to the rate of change of the negative driving voltage (divisions d1 and d2). In the printer having the plurality of nozzles Nz, however, it is extremely difficult to change the waveform of the driving signal for each dot. This embodiment accordingly provides a driving signal that includes two pulse signals of different waveforms, and records print data according to this driving signal, so as to create large dots and small dots. The details of this technique are described below.

E. Piezoelectric Element-Driving Circuit and Driving Signal

In this embodiment, two types of driving waveforms, that is, the waveform for creating small dots having a smaller dot diameter and the waveform for creating large dots having a greater dot diameter, are provided (see FIG. 11), based on the relationship between the driving waveform and the dot diameter. The process of creating large and small ink droplets in response to the difference in driving signal will be discussed later, together with the details of generation of the driving signal.

Figure 11:
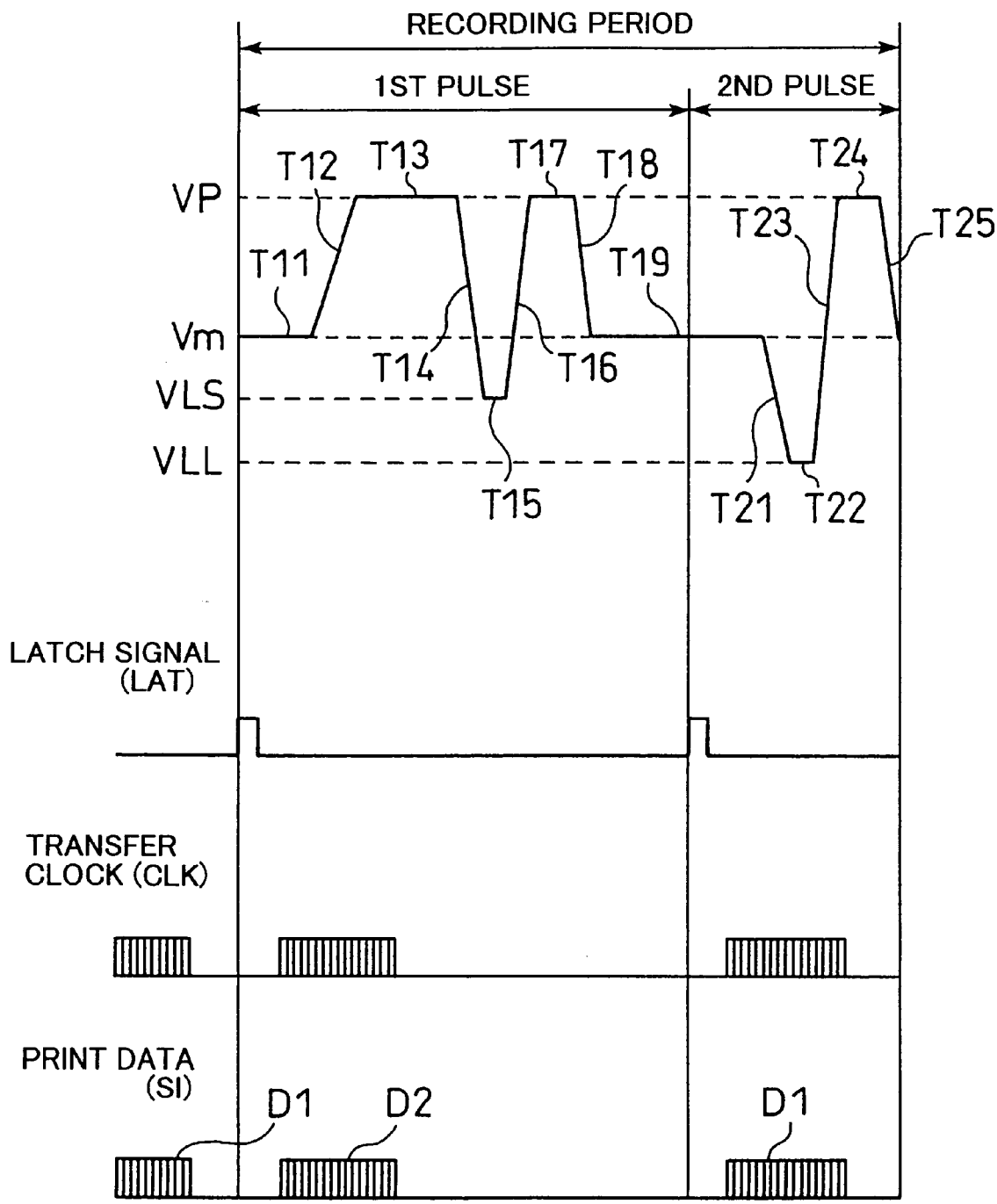
Figure 12:
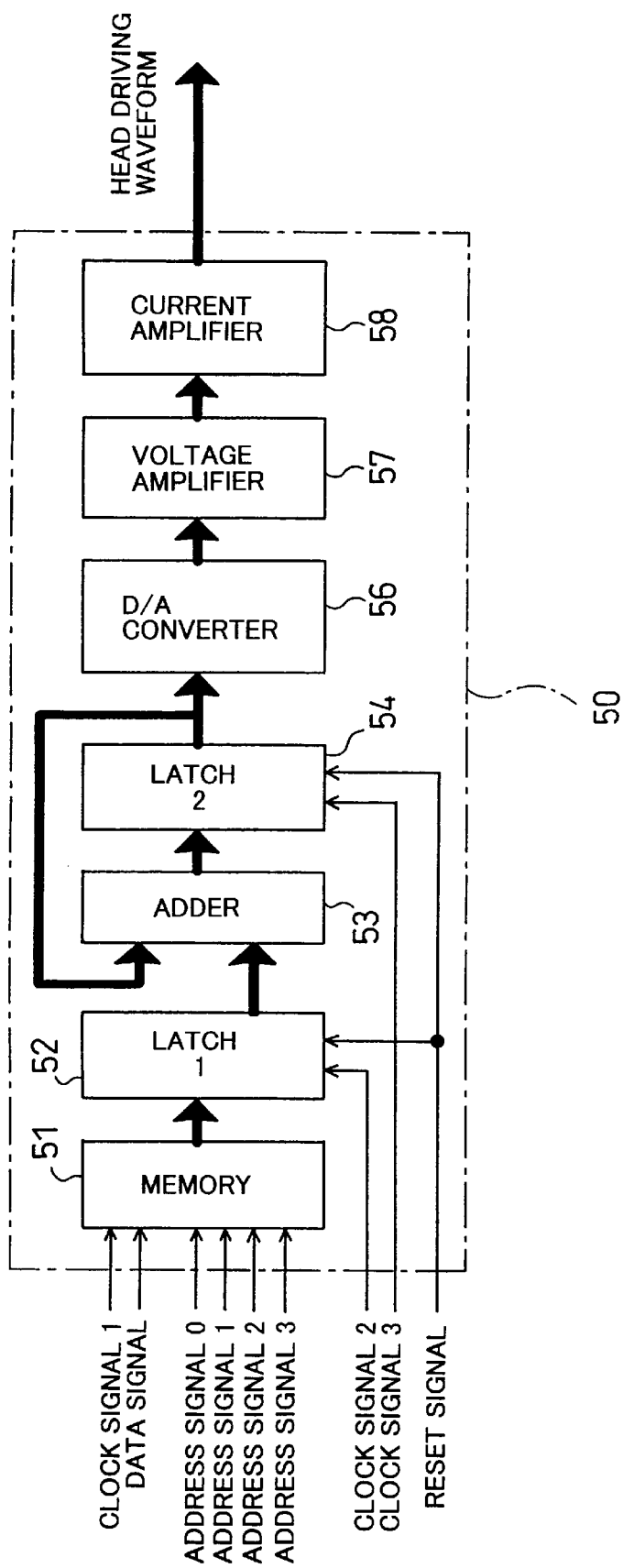
FIG. 12 is a block diagram illustrating the internal structure of the piezoelectric element-driving circuit 50.

The following describes the structure for generating the driving signal that has the waveform shown in FIG. 11. The driving signal shown in FIG. 11 is generated by the piezoelectric element-driving circuit 50. FIG. 12 is a block diagram illustrating the internal structure of the piezoelectric element-driving circuit 50. As illustrated, the piezoelectric element-driving circuit 50 includes a memory 51 that receives and stores the signals output from the control circuit 40, a latch 52 that reads out the contents of the memory 51 and temporarily keeps the contents, an adder 53 that sums up an output of the latch 52 and an output of another latch 54, a D/A converter 56 that converts the output of the latch 54 into analog data, a voltage amplifier 57 that amplifies the converted analog signal to a specific voltage amplitude for driving the piezoelectric element PE, and a current amplifier 58 for supplying an electric current corresponding to the amplified voltage signal. The memory 51 stores predetermined parameters used for determining the waveform of the driving signal. As discussed later, the predetermined parameters previously input from the control circuit 40 determines the waveform of the driving signal. The piezoelectric element-driving circuit 50 receives clock signals 1, 2, 3, data signals, address signals 0 through 3, and a reset signal from the control circuit 40 as shown in FIG. 12.

Figure 13:
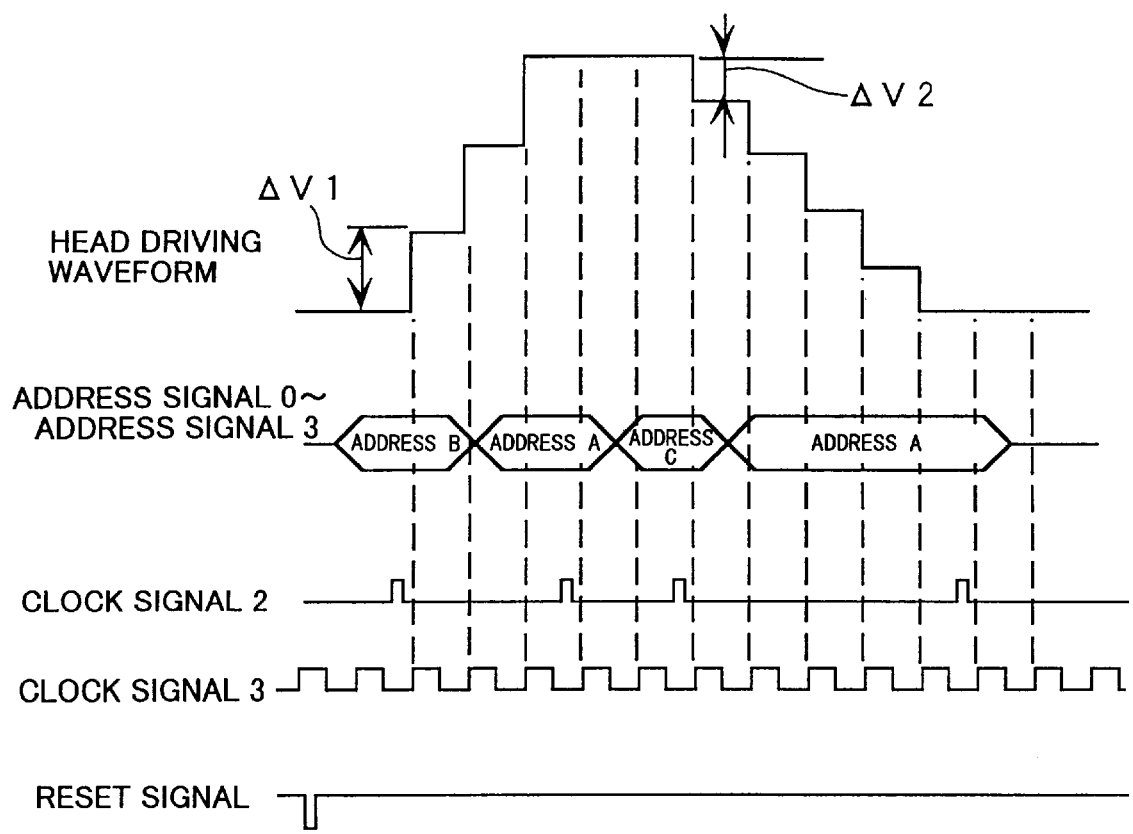
FIG. 13 shows the process of generating driving pulses.
Figure 14:
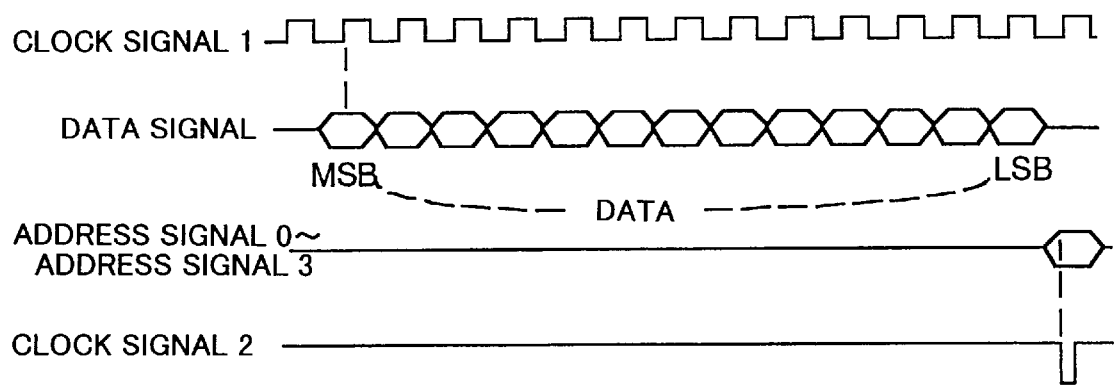
FIG. 14 is a timing chart showing the timing of the respective signals when the data signal is used to set the slew rate in the memory 51.

FIG. 13 shows the process of determining the waveform of the driving signal in the structure of the piezoelectric element-driving circuit 50 discussed above. Prior to the generation of the driving signal, the control circuit 40 outputs several data signals, which represent slew rates of the driving signal, and address signals of the data signals synchronously with the clock signal 1 to the memory 51 in the piezoelectric element-driving circuit 50. Here the data signal has the capacity of only one bit. As shown in FIG. 14, data is transmitted through the serial transfer that utilizes the clock signal 1 as the synchronizing signal. The process of transferring predetermined slew rates from the control circuit 40 first outputs data signals of plural bits synchronously with the clock signal 1 and subsequently outputs addresses for storing the data as the address signals 0 through 3 synchronously with the clock signal 2. The memory 51 reads the address signals at the timing of the output of the clock signal 2 and writes the input data at the corresponding addresses. Each address signal is a 4-bit signal in the range of 0 through 3, so that sixteen slew rates at the maximum can be stored in the memory 51. The upper-most bit of the data is used for a code.

After conclusion of setting the slew rates to respective addresses A, B, . . . , when the address B is output in the address signals 0 through 3, the first pulse of the clock signal 2 causes the first latch 52 to hold the slew rate corresponding to the address B. The subsequent output of the clock signal 3 in this state causes the second latch 54 to hold the sum of the output of the second latch 54 and the output of the first latch 52. Referring to FIG. 13, once the slew rate is selected corresponding to the address signal, every time the clock signal 3 is input, the output of the second latch 54 is varied according to the slew rate. The slew rate stored at the address B is a value for increasing the voltage by ΔV1 per unit time ΔT. The code of the data stored at each address determines whether the output of the second latch 54 is increased or decreased.

In the example of FIG. 13, the value '0', that is, the value for keeping the voltage, is stored as the slew rate at the address A. When the clock signal 2 makes the address A valid, the waveform of the driving signal is kept without any variation, that is, in the flat state. The slew rate stored at the address C is a value for decreasing the voltage by ΔV2 per unit time ΔT. After the clock signal 2 makes the address C valid, the voltage thus gradually drops by ΔV2.

The waveform of the driving signal can be controlled freely by simply outputting the address signals and the clock signal 2 from the control circuit 40 according to the procedure described above. The respective pulses included in the driving signal of the embodiment are described with the graph of FIG. 11. The driving signal mainly includes a first pulse and a second pulse in a recording period corresponding to recording of one pixel. The first pulse starts its voltage at a middle potential Vm (T11), increases to a maximum potential VP by a fixed gradient (T12), and keeps the maximum potential VP for a predetermined time period (T13). The first pulse then drops to a first minimum potential VLS by a fixed gradient (T14), and keeps the minimum potential VLS for a predetermined time period (T15). The voltage of the first pulse again increases to the maximum potential VP by a fixed gradient (T16), and keeps the maximum potential VP for a predetermined time period (T17). The first pulse subsequently drops to the middle potential Vm by a fixed gradient (T18).

Application of a charging pulse T12 to the piezoelectric element PE deflects the piezoelectric element PE in the direction to reduce the volume of the pressure chamber 132 and thereby causes a positive pressure in the pressure chamber 132. The meniscus is accordingly convexed outward the nozzle opening 123. When the charging pulse T12 has a large potential difference and gives a sharp voltage gradient, it is possible to spout an ink droplet by the charging pulse T12. In this embodiment, however, the potential difference of the charging pulse T12 is set in the range that does not allow an ink droplet to be spouted by the charging pulse T12. This embodiment further sets the charging time of the charging pulse T12 to a period of not shorter than Tc (in this embodiment, practically the same period as Tc) not to cause the meniscus to excite the vibration of the Helmholtz period Tc.

During application of a hold pulse T13, the meniscus once convexed by the charging pulse T12 is returned inward the nozzle opening 123 at the vibration of the period Tm by the surface tension of the ink. Application of a discharging pulse T14 deflects the piezoelectric element PE in the direction to expand the pressure chamber 132 and causes a negative pressure in the pressure chamber 132. The movement of the meniscus inward the nozzle opening 123 by this negative pressure is superposed upon the vibration of the period Tm, so that the meniscus is concaved significantly inward the nozzle opening 123. Application of the discharging pulse T14 at the timing when the meniscus goes inward the nozzle opening 123 enables even the relatively small potential difference of the discharging pulse T14 to significantly concave the meniscus inward the nozzle opening 123. In this embodiment, the duration of the hold pulse T13 is set to be approximately half the period Tm, in order to ensure the concaving movement of the meniscus.

Application of a charging pulse T16 in the state of concave meniscus causes a positive pressure in the pressure chamber 132 and convexes the meniscus outward the nozzle opening 123. Since the meniscus has been concaved significantly inward the nozzle opening 123, application of the positive pressure causes only a small ink droplet to be spouted. A discharging pulse T18 interferes with the natural vibration of the meniscus excited by the discharging pulse T14 and the charging pulse T16. The discharging pulse T18 to concave the meniscus inward the nozzle opening 123 is applied at the timing when the natural vibration of the period Tc goes towards the nozzle opening 123. This results in a relatively small concavity of the meniscus after conclusion of the spout of a small ink droplet.

The second pulse follows the first pulse and starts at the middle potential Vm (T19). The second pulse then drops to a second minimum potential VLL by a fixed gradient (T21) and keeps the minimum potential VLL for a predetermined time period (T22). The minimum potential VLL of the second pulse is lower than the minimum potential VLS of the first pulse. The voltage of the second pulse subsequently increases to the maximum potential VP by a fixed gradient (T23) and keeps the maximum potential VP for a predetermined time period (T24). The second pulse then drops to the middle potential Vm by a fixed gradient (T25).

Application of a discharging pulse T21 causes a negative pressure in the pressure chamber 132, so that the meniscus is concaved inward the nozzle opening 123. The potential difference of the discharging pulse T21 is set to be smaller than the potential difference of the discharging pulse T14 of the first pulse. The slew rate is accordingly set to prevent the meniscus from being significantly concaved inward the nozzle opening 123 like the first pulse.

Application of a charging pulse T23 causes a positive pressure in the pressure chamber 132, so that the meniscus is convexed outward the nozzle opening 123. At this moment, the pressure varies in the increasing direction while the meniscus has not been concaved significantly inward the nozzle opening 123. This results in spouting a larger ink droplet, compared with the first pulse. A last discharging pulse T25 of the second pulse interferes with the natural vibration of the meniscus excited by the discharging pulse T21 and the charging pulse T23. The discharging pulse T25 is applied at the timing when the meniscus goes towards the nozzle opening 123 at the natural vibration of the period Tc.

Figure 15:
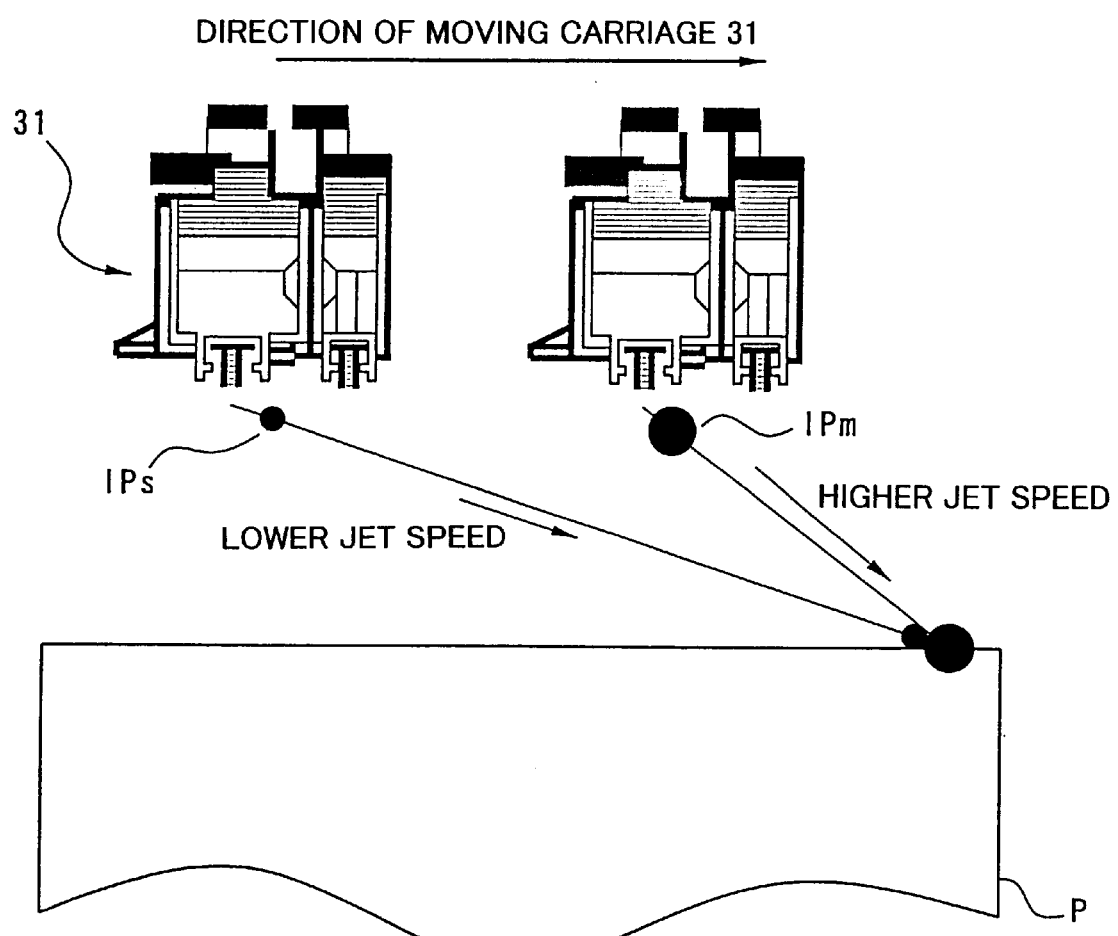
FIG. 15 schematically illustrates the state of hitting two spouted ink droplets, that is, larger and smaller ink droplets, on the sheet of paper P.

In the case where both the first pulse and the second pulse are selected consecutively, two ink droplets are spouted from the nozzle Nz. The two ink droplets hit almost the same position on the paper. This state is shown in FIG. 15. As illustrated, a smaller ink droplet IPs corresponding to the first pulse and a larger ink droplet IPm corresponding to the second pulse hit almost the same position on the paper, so as to create a largest dot. When the two types of dots are created with the driving signal shown in FIG. 11, the second pulse leads to a greater amount of change of the piezoelectric element PE and thereby causes the ink droplet IP to be spouted vigorously. The jet speed of the larger ink droplet IPm is accordingly higher than that of the smaller ink droplet IPs. Namely there is a difference in jet speed between these two types of ink droplets. When a smaller ink droplet and a larger ink droplet are spouted in this sequence in the course of moving the carriage 31 in the main scanning direction, regulation of the scanning speed of the carriage 31 and the jet timings of both the ink droplets according to the distance between the carriage 31 and the sheet of paper P enables both the ink droplets to reach the sheet of paper P at the substantially identical time. In this manner, the embodiment creates a largest dot of a greatest dot diameter with the two driving pulses shown in FIG. 11.

F. Vibration of Meniscus and Timing of Second Pulse

As described previously, this embodiment enables the spout of an ink droplet corresponding to the first pulse and the spout of an ink droplet corresponding to the second pulse to be carried out separately or consecutively. The timings of generating the first pulse and the second pulse are regulated by taking into account the vibration of the meniscus, so as to make the total ink weight of the largest ink droplet, which is formed by the consecutive output of the first pulse and the second pulse, significantly greater than the sum of the ink weights of the corresponding ink droplets, which are formed separately. This is described more in detail. FIG. 16 shows the relationship between the pulse selection and the weight of the ink droplet per one recording period in this embodiment. The total ink weight when the first pulse and the second pulse are selected consecutively is greater by 5 ng than the sum of the ink weights when the first pulse and the second pulse are selected separately. The increase in ink weight is ascribed to formation of a second ink droplet at a predetermined time that takes into account the movement of the meniscus, after spout of a small ink droplet. This results in increasing the ratio of the ink weight of the largest dot (20 ng in this embodiment) to the ink weight of the small dot (5 ng in this embodiment), thereby practically extending the variable range of the diameter of the recorded dot. In accordance with this procedure, the duration of the hold pulse T19 is set to make the time period between the end of the charging pulse T16 of the first pulse, which represents the 'time of spouting the first ink droplet', and the start of the charging pulse T21 of the second pulse, which represents the 'start timing of the first signal to expand the pressure chamber', equal to '(the recovery time of the meniscus after the spout of the first ink droplet)+(⅛ the period Tm of the meniscus natural vibration)'.

Figure 17:
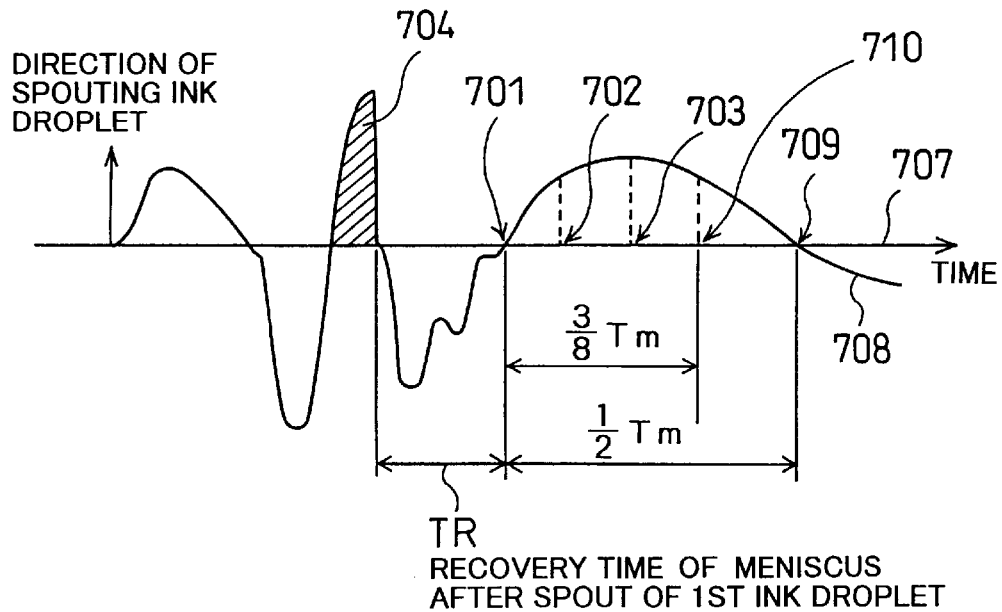
FIG. 17 is a graph showing a displacement of the meniscus when ink is spouted in response to a single pulse.
Figure 18:
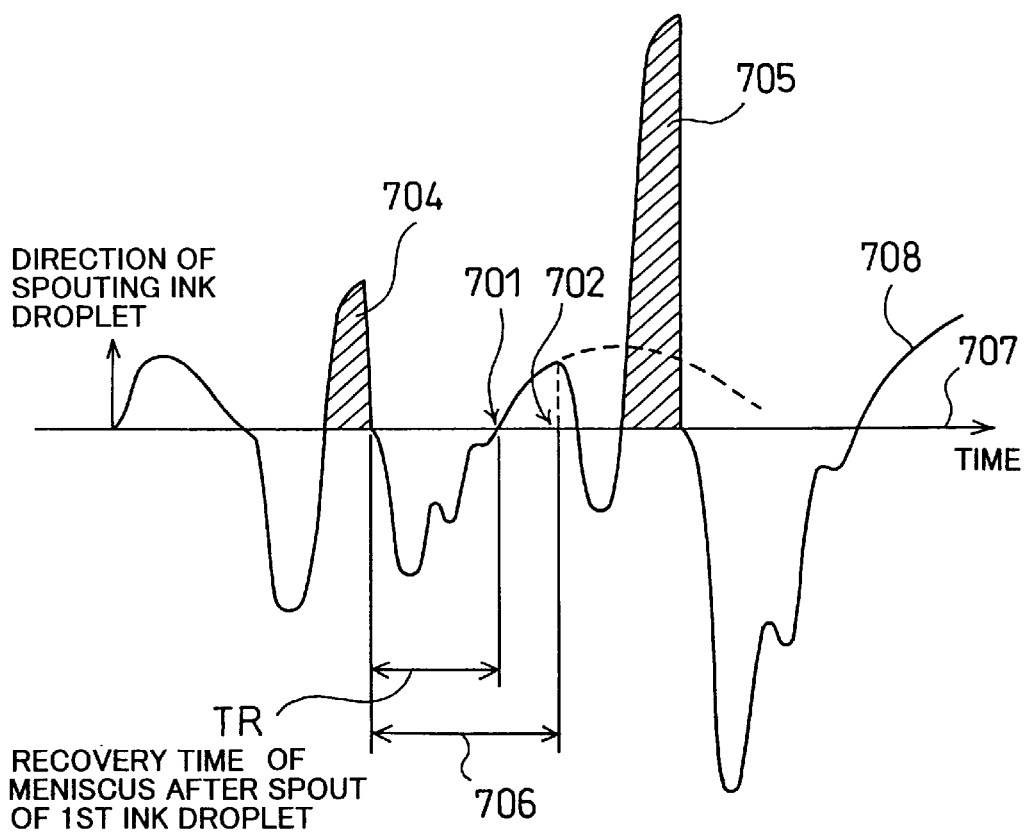
FIG. 18 is a graph showing a displacement of the meniscus when ink is spouted in response to two consecutive pulses.

FIGS. 17 and 18 show the movement of the meniscus in the first embodiment, where the displacement of the meniscus is plotted as ordinate and the time as abscissa. A line 707 represents an opening surface of the nozzle opening 123, and the lower portion of the nozzle opening surface 707 corresponds to the inside of the nozzle opening 123. A curve 708 represents a displacement of the meniscus. The slope of the tangent (derivative) of the curve 708 accordingly shows the speed of the meniscus. In the case of spout of an ink droplet, the area of a closed region (hatched area), which is defined by the curve 708 and the abscissa and is located above the abscissa, corresponding to the jet timing is substantially proportional to the weight of the ink droplet.

FIG. 17 shows the displacement of the meniscus when the first pulse is applied independently. An ink droplet is spouted in response to a peak 704 of the meniscus vibration. At this moment, a small ink droplet is separated from the meniscus and spouted. The meniscus is then concaved inward the nozzle opening surface 707. The concaved meniscus starts returning towards the nozzle opening surface 707 by the surface tension of the meniscus, and reaches the nozzle opening surface 707 at a time point 701. The time period elapsing between the timing of the spout of the first ink droplet and the time point 701 corresponds to the 'recovery time TR of the meniscus after the spout of the first ink droplet'. The meniscus continues moving outward to be convexed from the nozzle opening surface 707 and then starts returning inward. Namely the meniscus has a damped oscillation. The meniscus again returns to the nozzle opening surface 707 at a time point 709. The time period elapsing between the time point 701 and the time point 709 is approximately equal to half the period Tm of the natural vibration of the meniscus. At a time point 703, the displacement of the meniscus reaches the maximum after the spout of the first ink droplet. The time period elapsing between the time point 701 and the time point 703 is approximately equal to one quarter the period Tm of the natural vibration of the meniscus. A time point 702 is substantially the middle of the time point 701, when the speed of the meniscus going outward the nozzle opening 123 reaches the maximum, and the time point 703. The time period elapsing between the time point 701 and the time point 702 is approximately equal to one eighth the period Tm of the natural vibration of the meniscus. A time point 710 is substantially the middle of the time point 703 and the time point 709. The time period elapsing between the time point 701 and the time point 710 is approximately equal to three eighths the period Tm of the natural vibration of the meniscus.

Referring to FIG. 18, the following describes the phenomenon of increasing the weight of the ink droplet when the second pulse is applied immediately after the first pulse. In this embodiment, as shown in FIG. 18, the driving signal is set to start the application of the discharging pulse T21, which represents the 'timing of starting the first signal to expand the pressure chamber', at the time point 702. Both the displacement speed of the meniscus and the displacement of the meniscus vary outward the nozzle opening 123 at the time point 702. This compensates the action of concaving the meniscus inward the nozzle opening 123 by the discharging pulse T21 of the second pulse, and thereby reduces the concave amount of the displacement 708 of the meniscus. Application of the charging pulse T23 heightens a peak 705 of the meniscus vibration and causes a large ink droplet to be separated from the meniscus. In the graph of FIG. 18, a time span 706 denotes the time difference between the end of the charging pulse T16, which represents the 'time of the spout of the first ink droplet', and the start of the discharging pulse T21, which represents the 'timing of starting the first signal to expand the pressure chamber'.

Figure 19:
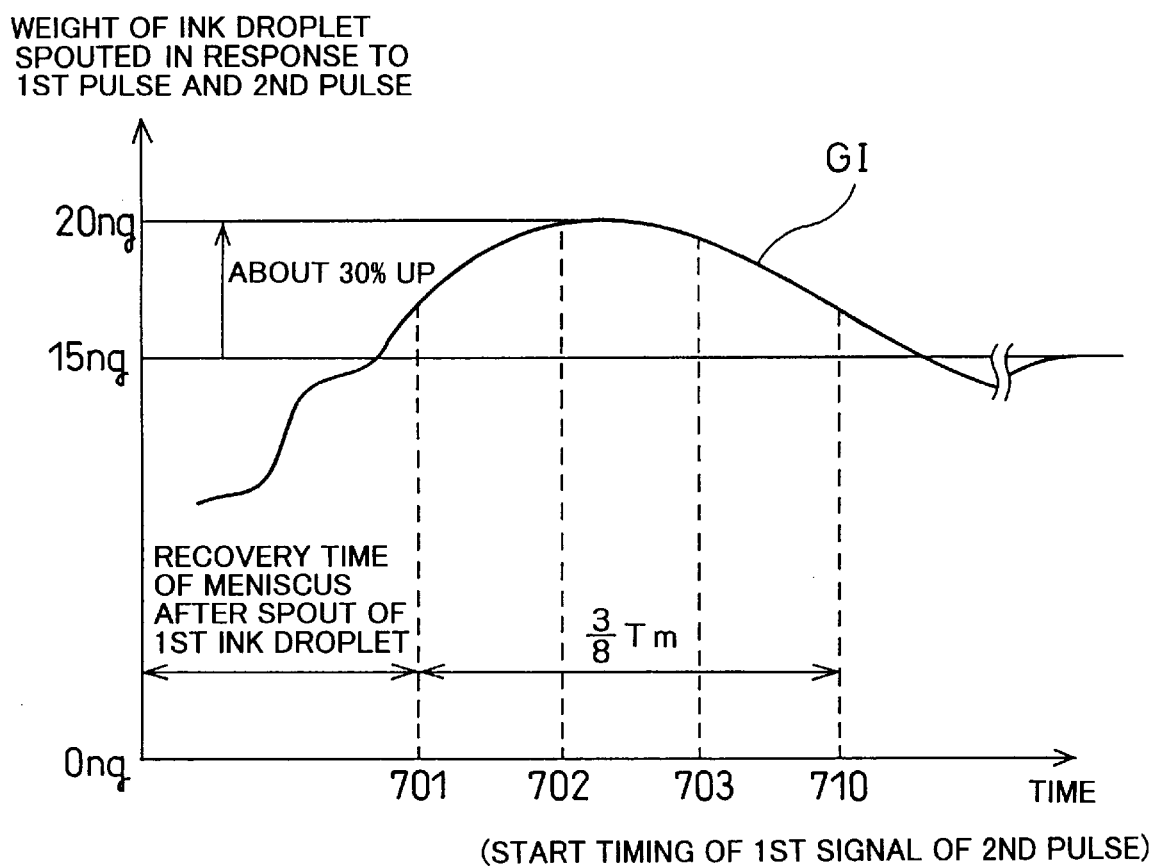
FIG. 19 is a graph showing the relationship between the total weight of ink droplets spouted in response to two pulses and the start timing of the first signal of the second pulse.

FIG. 19 shows the relationship between the phase of the 'start timing of the first signal of the second pulse' and the total weight of the ink droplets spouted in response to the first pulse and the second pulse. The ordinate shows the total weight of the ink droplets spouted in response to the first pulse and the second pulse, and the abscissa shows the time. An ink droplet weight curve GI represents a variation in sum of the ink weight when the start timing of the first signal of the second pulse is changed from the time point 701 to the time point 710. The total weight of the ink droplet reaches the maximum, 20 ng, when the start timing of first signal of the second pulse is set close to the time point 702. As the start timing of the first signal of the second pulse is delayed, the total weight of the ink droplet asymptotically approaches the sum of the ink droplets, (5+10=) 15 ng, when the first pulse and the second pulse are output independently. As the start timing of the first signal of the second pulse is advanced, on the contrary, the total weight of the ink droplet also decreases. This is because the discharging pulse T21 of the second driving pulse causes the meniscus, which has already been concaved inward the nozzle opening 123, to be further concaved inward the nozzle opening 123. As clearly understood from the graph of FIG. 18, it is preferable that the time difference between the time of the spout of the first ink droplet and the start timing of the first voltage drop waveform of the second driving pulse is set to be longer than the recovery time TR of the meniscus after the spout of the first ink droplet and shorter than the (recovery time TR of the meniscus after the spout of the first ink droplet)+(⅜ the period Tm of the natural vibration of the meniscus). Namely setting the start timing of the first signal of the second pulse in the range of the time point 701 to the time point 710 increases the total weight of the ink droplet, compared with the sum of the ink droplets spouted separately in response to the two pulses.

G. Modification of Driving Circuit 50

Figure 20:
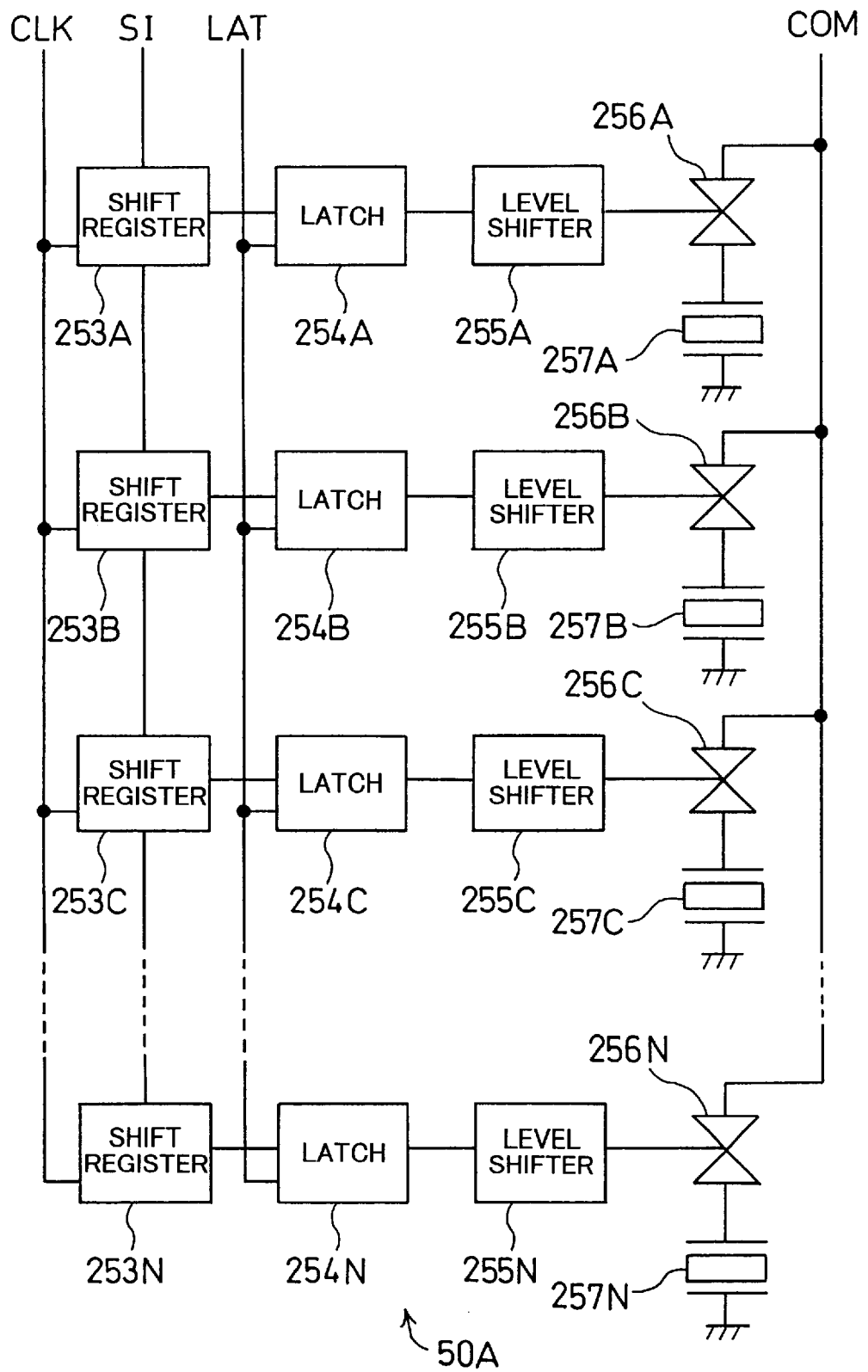
FIG. 20 is a block diagram schematically illustrating the structure of another piezoelectric-driving circuit as a modification of the first embodiment.

In the first embodiment discussed above, the driving signal applied to the piezoelectric element PE is generated through the D/A converter 56, based on an instruction output from the control circuit 40. The driving circuit for generating the driving signal may be actualized by another circuit 50A shown in FIG. 20. The structure of the driving circuit 50A is described with FIG. 20. The driving circuit 50A includes shift registers 253A through 253N, latch elements 254A through 254N, level shifters 255A through 255N, switch elements 256A through 256N, and piezoelectric elements 257A through 257A corresponding to the respective nozzles on the head 28. Print data is constructed as 2-bit data, such as (10) and (11), for each nozzle. Bit data of the respective columns for all the nozzles are input into the shift registers 253A through 253N in one recording period.

Data of the upper bit or bit 2 with respect to all the nozzles are serially transferred to the shift registers 253A through 253N and latched by the latch elements 254A through 254N. The latch enables data of the lower bit or bit 1 with respect to all the nozzles to be serially transferred to the shift registers 253A through 253N.

When the bit data '1' is input into the respective switch elements 256A through 256N constructed as analog switches, a driving signal (COM) is directly applied to the piezoelectric elements 257A through 257N. The piezoelectric elements 257A through 257N are then displaced according to the waveform of the driving signal. When the bit data '0' is applied to the respective switch elements 256A through 256N, on the other hand, the flow of the driving signal to the piezoelectric elements 257A through 257N is cut off. The piezoelectric elements 257A through 257N accordingly maintain the previous electric charges.

Figure 1:
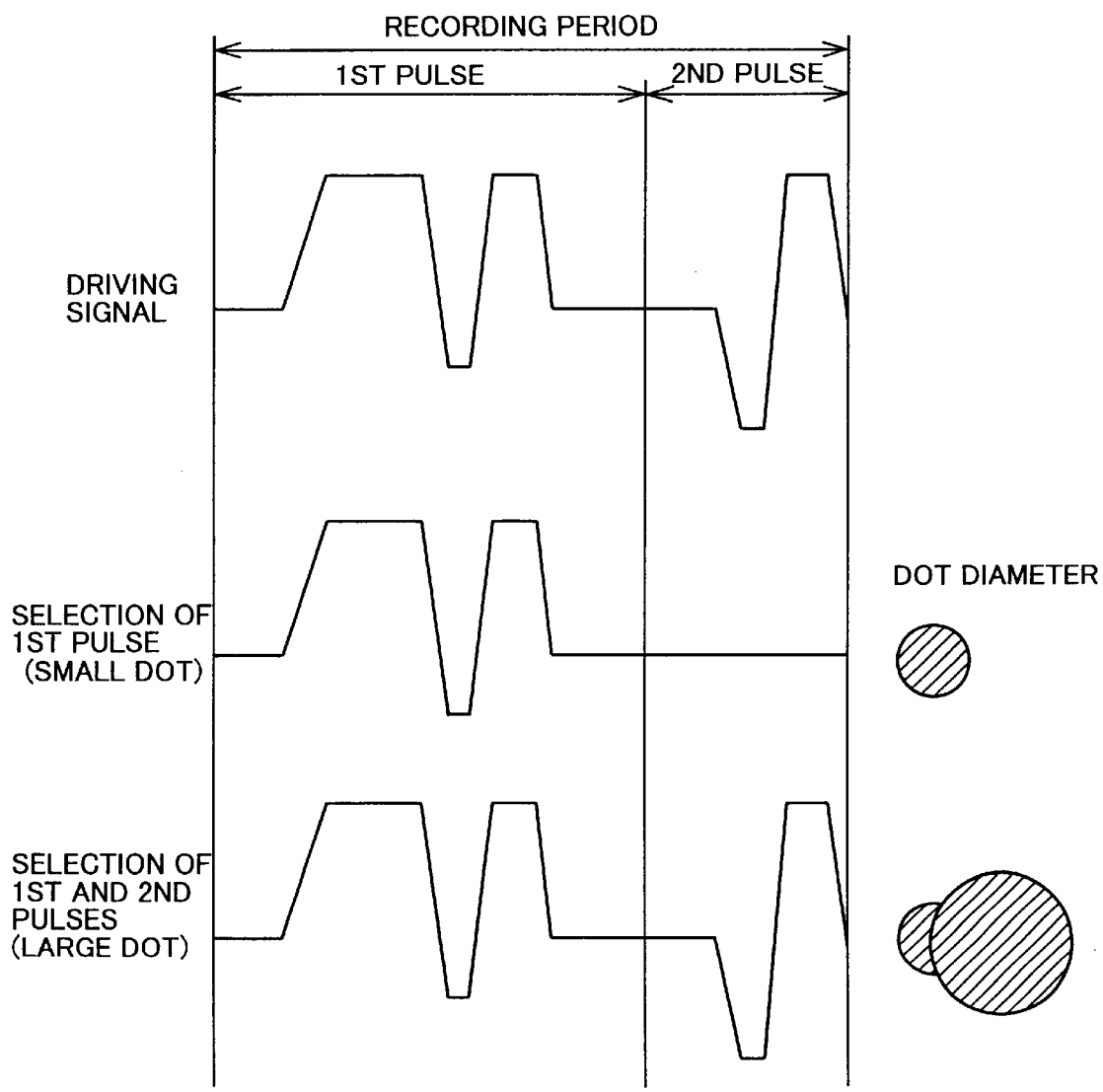
FIG. 1 is a graph showing an exemplified driving signal for piezoelectric elements in an embodiment according to the present invention.

The driving signal (COM) in this circuit 50A has the waveform shown in FIG. 1 and includes the first pulse and the second pulse to form a smaller ink droplet and a larger ink droplet, like the first embodiment.

A small ink droplet of, for example, 5 ng, is spouted in response to the first pulse. The first pulse is independently selected to record a small dot having a small dot diameter. In the example of FIG. 1, the second pulse is selected only after the first pulse and never selected independently. In the case of recording a large dot, the consecutive selection of the first pulse and the second pulse enables formation of a large ink droplet of, for example, (5+15=)20 ng, and creation of a large dot having a large dot diameter, as discussed above in the first embodiment.

There are three levels of tone expression for recording dots on the recording paper; that is, no creation of dots (tone value 1), creation of only a small dot (tone value 2), and creation of a large dot (tone value 3). Each tone value may be expressed as 2-bit data, such as (00), (01), and (10).

In the case of the tone value '2' that spouts only a small ink droplet and creates a small dot, the bit data '1' is input synchronously with the first pulse to the switch element 256, whereas the bit data '0' is input to the switch element 256 in response to the second pulse. This enables only the first pulse to be fed to the piezoelectric element 257. Translating (decoding) the 2-bit data (01) representing the tone value '2' into the 2-bit data (10) causes only the first pulse to be applied to the piezoelectric element 257 and effects the tone value '2' for creating a small dot.

In a similar manner, when the decoded 2-bit data (11) is input to the switch element 256, the first pulse and the second pulse are applied to the piezoelectric element 257 and cause a smaller ink droplet and a larger ink droplet to consecutively hit the recording paper. The mixture of the smaller ink droplet and the larger ink droplet practically creates a large dot and realizes the tone value '3'. In the case of the tone value '1' that does not spout an ink droplet nor creates any dot, the 2-bit data (00) is input to the switch element 256. This does not apply any pulse to the piezoelectric element 257 and realizes the tone value 1 for creating no dots.

The following describes a concrete configuration for inputting 2-bit print data to the switch elements 256. Two-bit print data (D1,D2) decoded by the control circuit 46 are stored in the output buffer 44C, where D1 denotes a first pulse selection signal and D2 denotes a second pulse selection signal. The 2-bit print data are input to the switch elements 256 corresponding to the respective nozzles on the record head 28 in one recording period. It is here assumed that the number of nozzles on the record head 28 is equal to 'n', and that print data of a first nozzle and a second nozzle at a certain position in the sub-scanning direction are expressed respectively as (D11,D21) and (D12,D22). Data (D11,D12,D13, , . . . D1n) of the first pulse selection signal D1 with respect to all the nozzles are serially input synchronously with a clock signal into the shift registers 253. In a similar manner, data (D21,D22,D23, . . . ,D2n) of the second pulse selection signal D2 with respect to all the nozzles are transferred to the shift registers 253 in one recording period. This state is shown in the bottom of FIG. 11.

As shown in FIG. 11, prior to the timing for generating a target driving pulse, print data relating to the driving pulse is transferred to the shift register 253. The print data set in the shift register 253 is transferred to and stored in the latch element 254 synchronously with generation of the target driving pulse. The print data stored in the latch element 254 is pressurized by the level shifter 255 and given as the driving signal to the piezoelectric element 257 via the switch element 256.

H. Second Embodiment

The following describes a second embodiment according to the present invention. The printing apparatus of the second embodiment has the same general structure as that of the first embodiment. The difference of the second embodiment from the first embodiment is that the time difference between the time of spouting an ink droplet in response to the first pulse and the start timing of the first signal of the second pulse is varied according to the environmental temperature of the print head 28 for ink jet recording.

Figure 21:
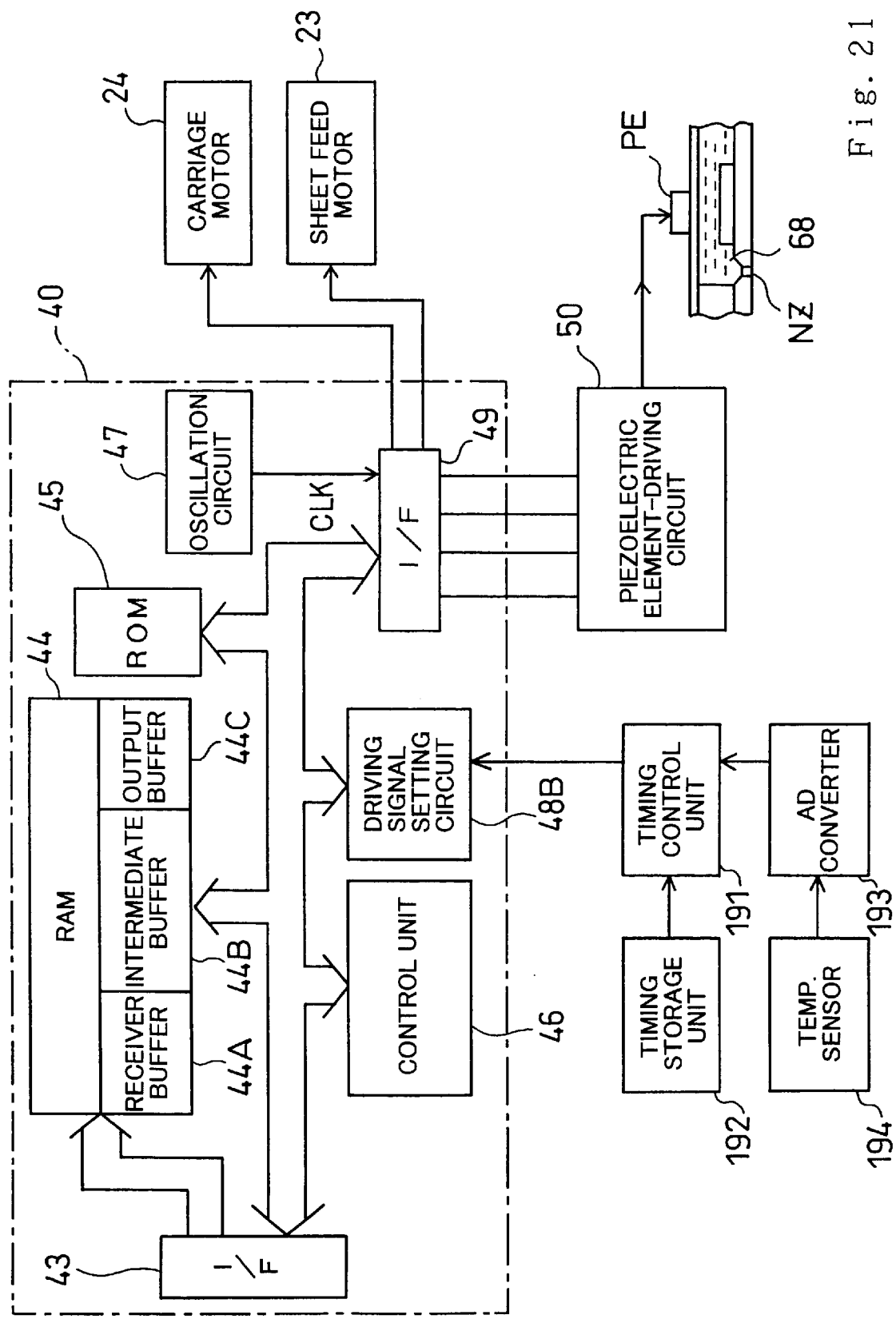
FIG. 21 is a block diagram illustrating the internal structure of a printer in a second embodiment according to the present invention.

FIG. 21 is a block diagram illustrating the internal structure of the printer 22 in the second embodiment. The printer 22 of this embodiment includes a timing storage unit 192, a timing control unit 191, a temperature sensor 194, and an AD converter 193, in addition to the control circuit 40 and the piezoelectric element-driving circuit 50. The temperature sensor 194 measures the temperature in the circumference of the print head 28. The temperature sensor 194 detects the environmental temperature as a parameter that reflects the ease of spout of the ink. The temperature data obtained by the temperature sensor 194 is given to the timing control unit 191 via the AD converter 193. The timing control unit 191 reads out the condition on 'the start timing of the first signal of the second pulse', which has been stored in advance in the timing storage unit 192, based on the temperature data input from the temperature sensor 194, and outputs the condition to a driving signal setting circuit 47 in the control circuit 40. The driving signal setting circuit 47 receives the input condition, specifies information on the start timing of the first signal of the second pulse, and gives the information to the piezoelectric element-driving circuit 50 via the I/F 49, so as to regulate the timing of the driving signal. This arrangement enables the timing of the driving signal of the second pulse to be regulated according to the environmental temperature. Another possible structure has only the temperature sensor 194 as an additional element and causes the control circuit 40 to determine the timing of the driving signal.

Figure 22:
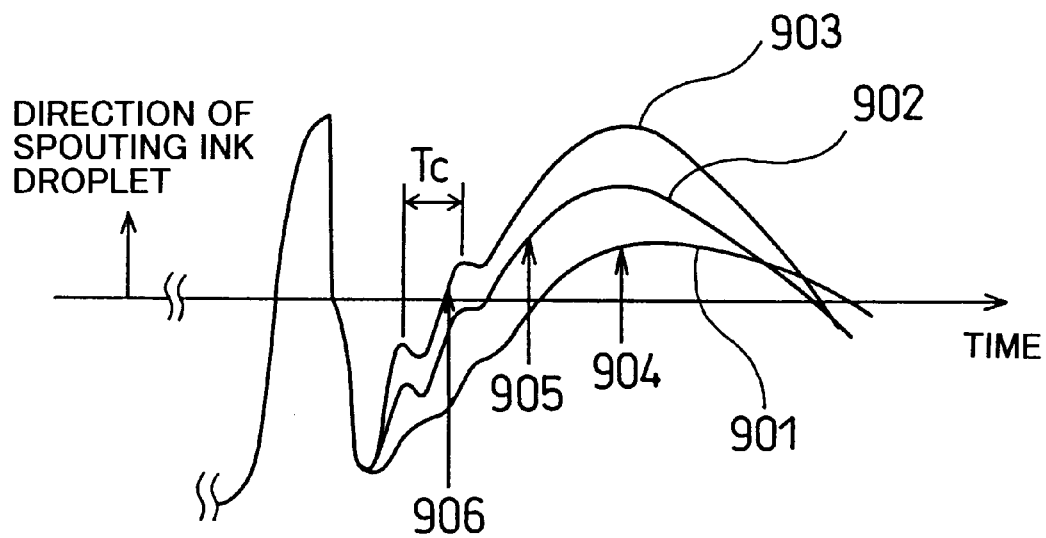
FIG. 22 is a graph showing displacements of the meniscus in the second embodiment.

FIG. 22 shows variations in movement of the meniscus at the environmental temperatures of 15° C., 25° C., and 40° C. in the printer using a specific ink, where the displacement of the meniscus is plotted as ordinate and the time as abscissa. A curve 901 represents a displacement of the meniscus at 15° C., and curves 902 and 903 respectively represent displacements of the meniscus at 25° C. and 40° C.

The ink used in this example has the viscosity varying with a variation in temperature. The viscosity of the ink decreases with an increase in temperature. Because of the temperature dependence of the ink viscosity, the displacement 901 of the meniscus at 15° C. has a greater flow resistance than that of the displacement 902 of the meniscus at 25° C. This causes the displacement 901 of the meniscus at 15° C. to have the greater attenuation of the meniscus vibration as well as the smaller amplitude of the Helmholtz resonance of the meniscus immediately after the spout of an ink droplet and the smaller amplitude of the natural vibration of the meniscus. Because of a decrease in flow resistance, on the other hand, the displacement 901 of the meniscus at 40° C. has a smaller attenuation of the meniscus vibration as well as a greater amplitude of the Helmholtz resonance of the meniscus and a greater amplitude of the natural vibration of the meniscus. The period Tm of the natural vibration is shortened with a decrease in flow resistance.

When the ink used for the printer has the viscosity significantly varying with a variation in temperature, the state of the meniscus vibration is remarkably changed according to the temperature dependence of the viscosity. The weight of the ink droplet may thus be varied significantly according to the temperature, if the time difference between the time of spouting an ink droplet in response to the first pulse and the start timing of the first signal of the second pulse is fixed irrespective of the environment. This is because the position and the speed of the meniscus are changed at the start timing of the first signal of the second pulse.

Referring to FIG. 22, when the ink of such properties is used, the start timing of the first signal of the second pulse is shifted according to the environmental temperature; that is, a time point 904 at 15° C., a time point 905 at 25° C., and a time point 906 at 40° C. This simple arrangement compensates the environmental dependence of the position and the speed of the meniscus to some extent, and interferes with a variation in weight of the ink droplet in response to the second pulse according to the environmental temperature. If there is another parameter relating to the ease of spout of the ink, the parameter is also detected to reflect the start timing of the first signal of the second pulse. The available parameters include the density of the ink, the atmospheric pressure, and a time-based variation of the properties of the piezoelectric element. Although direct detection of such parameters is desirable, the parameters may be estimated or specified by the user in the case where the direct detection is difficult. By way of example, the density of the ink may be estimated from the weight of the whole ink cartridge immediately after the replacement. The time-based variation of the properties of the piezoelectric element may be estimated from the elapse of time since the start of using the piezoelectric element. The information, such as the atmospheric pressure, may be obtained by a sensor installed in the printer. Alternatively the computer 90 may receive the data from a predetermined measuring system via the telephone network and transfer the input data to the printer 22.

I. Third Embodiment

The following describes a third embodiment according to the present invention. The printing apparatus, the printer, and the head driving apparatus of the third embodiment have the same structures as those of the second embodiment. The difference of the third embodiment from the second embodiment is that the time difference between the time of spouting an ink droplet in response to the first pulse and the start timing of the first signal of the second pulse is extended with an increase in environmental temperature.

Figure 23:
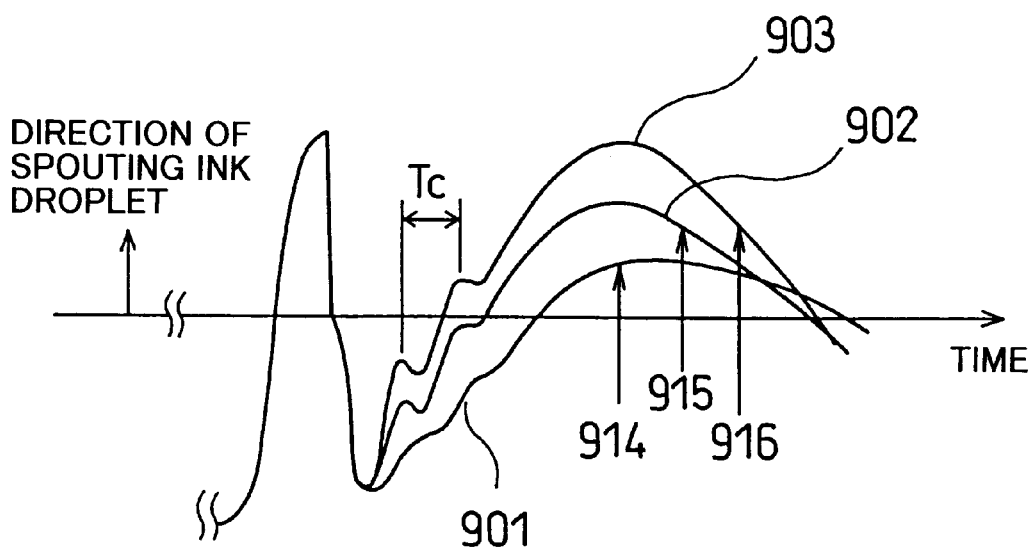
FIG. 23 is a graph showing displacements of the meniscus in a third embodiment according to the present invention.

Like FIG. 22, FIG. 23 shows variations in movement of the meniscus at the environmental temperatures of 15° C., 25° C., and 40° C. in the printer using a specific ink, where the displacement of the meniscus is plotted as ordinate and the time as abscissa.

Referring to FIG. 23, in this embodiment, the start timing of the first signal of the second pulse is delayed with an increase in environmental temperature; that is, a time point 914 at 15° C., a time point 915 at 25° C., and a time point

916 at 40° C. Like the second embodiment, the simple arrangement of this embodiment compensates the environmental dependence of the position and the speed of the meniscus to some extent, and interferes with a variation in weight of the ink droplet in response to the second pulse according to the environmental temperature. In this embodiment, since the start timing of the first signal of the second pulse is delayed with an increase in environmental temperature, there is little effect of the Tc vibration of the meniscus immediately after the spout of the first ink droplet at the start timing of the second pulse. This realizes the stable jet stream with a less deflected track.

J. Fourth Embodiment

The following describes a fourth embodiment according to the present invention. The fourth embodiment has a similar hardware structure to that of the first embodiment. In the fourth embodiment, the time of spouting the second ink droplet is determined by taking into account the period Tc of the Helmholtz resonance. The movement of the meniscus after the spout of a small ink droplet in response to the first pulse is observed minutely in the graphs of FIGS. 22 and 23. In addition to the significant movement of the meniscus according to the period Tm of the natural vibration of the meniscus, there is a vibration of the period Tc, which is significantly shorter than the period Tm, due to the Helmholtz resonance. The arrangement of determining the timing of the spout of an ink droplet in response to the second pulse by taking into account the period Tc of the Helmholtz resonance thus varies the weight of the ink droplet spouted in response to the second pulse.

Figure 24:
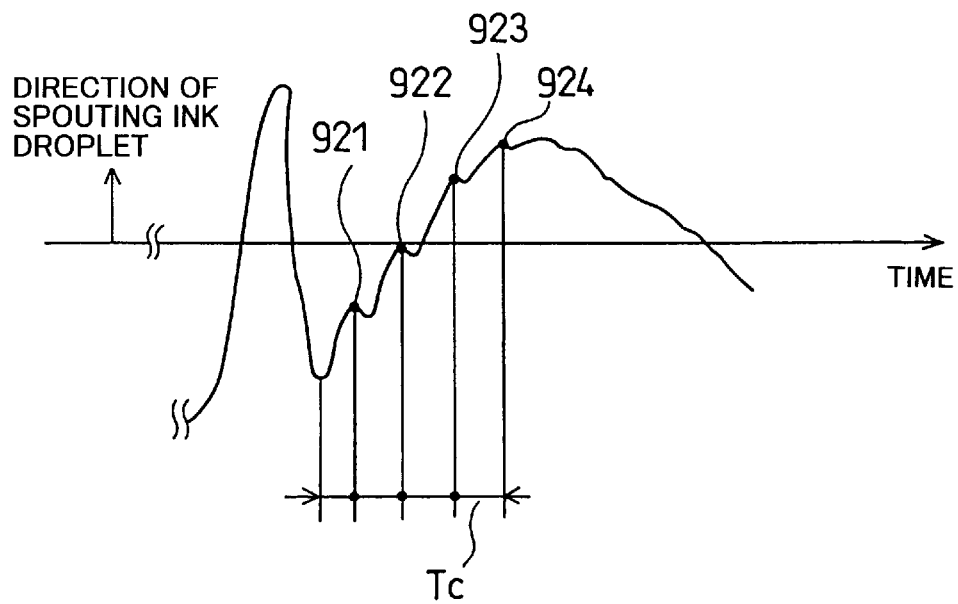
FIG. 24 is a graph showing a displacement of the meniscus in a fourth embodiment according to the present invention.

By way of example, FIG. 24 shows a minute movement of the meniscus when a specific ink is applied. This clearly shows superposition of the vibration of the period Tc due to the Helmholtz resonance over the natural vibration of the meniscus having the period Tm. The curve of FIG. 24 includes a first peak 921 of the vibration due to the Helmholtz resonance after conclusion of the spout of an ink droplet in response to the first pulse, a second peak 922, a third peak 923, and a fourth peak 924. The time of spouting an ink droplet in response to the second pulse is set to be an integral multiple (1-fold, 2-fold, 3-fold, . . . ) of this period Tc. This increases the weight of the ink droplet spouted in response to the second pulse. Setting the timing of spouting the second ink droplet to be (an integer+½) times the period Tc decreases the weight of the ink droplet spouted in response to the second pulse.

A consideration of the period Tc of the Helmholtz resonance of the meniscus enables the minute regulation of the weight of the ink droplet. By taking advantage of this characteristic, for example, the time of spouting the second ink droplet is delayed (or advanced) from an integral multiple of the period Tc to (an integer+½) times, as the viscosity of the ink decreases to facilitate the spout of an ink droplet. This compensates the gain of ease of the spout due to a variation in viscosity, and substantially maintains the weight of the ink droplet irrespective of the variation of the viscosity. It is also preferable to determine the start timing of the first signal of the second pulse and the time of spouting the second ink droplet by taking into account both the period Tm of the natural vibration of the meniscus and the period Tc of the Helmholtz resonance. This ensures the widest variable range of the ink weight from the condition of the maximum ink weight according to the optimal selection to the condition of the minimum ink weight according to the worst selection.

The present invention is not restricted to the above embodiments or their modifications, but there may be many other modifications, changes, and alterations without departing from the scope or spirit of the main characteristics of the present invention. For example, although a PZT of flexible vibrator type is adopted for the piezoelectric element in the above embodiment, a PZT of longitudinal vibration-transverse effect type may be used instead. In the latter case, charge and discharge are reversed from the case of the flexible vibrator-type PZT. Any appropriate element, such as a magnetostriction element, other than the piezoelectric element may be used for the pressure generating element.

The method of and the apparatus for driving the ink jet record head according to the present invention and the printing apparatus utilizing this driving method enable a single or a plurality of ink droplets to be spouted at one recording position and record a multi-tone image on a recording medium, such as paper. This technique is favorably applied to create a high-quality image with a printing apparatus having a less number of tones per dot, such as a printer.

What is claimed is:

1. An apparatus for driving an ink jet record head, wherein a pressure generating element and an opening is provided for each of a plurality of nozzles and said pressure generating element is actuated to cause an ink droplet to spout from the opening, said apparatus comprising:

a driving signal generation unit that generates a driving signal, which includes a first driving pulse for causing a first ink droplet to spout from said nozzle and a second driving pulse for causing a second ink droplet to spout from said nozzle that is greater in size than the first ink droplet;

a driving pulse selection unit that selects at least one driving pulse from the first driving pulse and the second driving pulse in one recording period corresponding to the recording of one pixel;

an element driving unit that drives said pressure generating element in response to the selected at least one driving pulse; and a dot creation unit configured to select both the first driving pulse and the second driving pulse in one recording period corresponding to the recording of one pixel so as to create a larger dot than dots formed by the first and second ink droplets.

2. An apparatus in accordance with claim 1, wherein a pressure chamber having a volume reduced by deformation of said pressure generating element to increase a liquid pressure of ink is disposed in connection with an ink conduit that is connected to said nozzle, and wherein said second driving pulse includes at least a first signal for expanding said pressure chamber, a second signal for keeping the expanded state of said pressure chamber, and a third signal for contracting said pressure chamber, and said driving signal generation unit sets a time difference between a time of spouting the first ink droplet and a start timing of the first signal of the second driving pulse to be longer than a recovery time TR of a meniscus after the spout of the first ink droplet and shorter than TR+3·Tm/8 where Tm denotes a period of a natural vibration of the meniscus.

3. An apparatus in accordance with claim 2, said apparatus further comprising:

a detection unit that detects a parameter, which reflects a property of the ink relating to a degree of spout of the ink; and a timing variation unit that changes the time difference between the time of spouting the first ink droplet and the start timing of the first signal by varying the start timing of the first signal based on the parameter detected by said detection unit.

4. An apparatus in accordance with claim 3, wherein said detection unit is a sensor that measures temperature of the ink as the parameter, and wherein the time difference between the time of spouting the first ink droplet and the start timing of the first signal is extended as the observed temperature increases from a lower temperature to a higher temperature.

5. An apparatus in accordance with claim 2, wherein said driving signal generation unit sets a time difference between a time of spouting the first ink droplet and a time of spouting the second ink droplet related to a period Tc of a Helmholtz resonance vibration of the ink in said pressure chamber.

6. An apparatus in accordance with claim 1, wherein a pressure chamber having a volume reduced by deformation of said pressure generating element to increase a liquid pressure of ink is disposed in connection with an ink conduit that is connected to said nozzle, and wherein said driving signal generation unit sets a time difference between a time of spouting the first ink droplet and a time of spouting the second ink droplet as proportionate to a period Tc of a Helmholtz resonance vibration of the ink in said pressure chamber.

7. An apparatus in accordance with claim 6, wherein said driving signal generation unit sets the time difference between the time of spouting the first ink droplet and the time of spouting the second ink droplet to be an integral multiple of the period Tc of the Helmholtz resonance vibration.

8. An apparatus in accordance with claim 6, said apparatus comprising:

a detection unit that detects a parameter affecting east of spout of the ink; and a unit that varies a time difference between the time of spouting the first ink droplet and a start timing of the first signal to be (an integer+½) times the period Tc based on the parameter detected by said detection unit.

9. A method of driving an ink jet record head, wherein a pressure generating element and an opening is provided for each of a plurality of nozzles and said pressure generating element is actuated to cause an ink droplet to spout from the opening, said method comprising the steps of:

generating a driving signal, which includes a first driving pulse for causing a first ink droplet to spout from said nozzle and a second driving pulse for causing a second ink droplet to spout from said nozzle that is greater in size than the first ink droplet;

selecting at least one driving pulse from the first driving pulse and the second driving pulse in one recording period corresponding to the recording of one pixel;

selecting both the first driving pulse and the second driving pulse in one recording period corresponding to the recording of one pixel so as to create a larger dot than dots formed by the first and second ink droplets; and driving said pressure generating element in response to the selected driving pulses.

10. A method in accordance with claim 9, wherein, the second driving pulse includes at least a first signal for expanding a pressure chamber, which has a volume reduced by deformation of said pressure generating element to increase a liquid pressure of ink, a second signal for keeping the expanded state of said pressure chamber, and a third signal for contracting said pressure chamber, and a time difference between a time of spouting the first ink droplet and a start timing of the first signal of the second driving pulse is set to be longer than a recovery time TR of a meniscus after the spout of the first ink droplet and shorter than TR+3·Tm/8 where Tm denotes a period of a natural vibration of the meniscus.

11. A method in accordance with claim 9, wherein a time difference between a time of spouting the first ink droplet and a time of spouting the second ink droplet is proportionate to a period Tc of a Helmholtz resonance vibration of the ink in said pressure chamber.

12. A printing apparatus having an ink jet record head, wherein a pressure generating element and an opening is provided for each of a plurality of nozzles and said pressure generating element is actuated to cause an ink droplet to spout from the opening, said printing apparatus recording an image on a recording medium with ink droplets spouted from said nozzle, said printing apparatus comprising:

a print data input unit that prints data having a tone value for each pixel included in the image;

a driving signal generation unit that generates a driving signal, which includes a first driving pulse for causing a first ink droplet to spout from said nozzle and a second driving pulse for causing a second ink droplet to spout from said nozzle that is greater in size than the first ink droplet;

a driving pulse selection unit that determines whether neither the first driving pulse nor the second driving pulse is selected not to spout any ink droplet, only one of the first driving pulse and the second driving pulse is selected, or both the first driving pulse and the second driving pulse are selected in one recording period corresponding to the recording of one pixel based on the tone value of the input print data; and an element driving unit that drives said pressure generating element in response to the selected driving pulses.

13. A printing apparatus in accordance with claim 12, wherein a pressure chamber having a volume reduced by deformation of said pressure generating element to increase a liquid pressure of ink is disposed in connection with an ink conduit that is connected to said nozzle, and wherein said second driving pulse includes at least a first signal for expanding said pressure chamber, a second signal for keeping the expanded state of said pressure chamber, and a third signal for contracting said pressure chamber, and said driving signal generation unit sets a time difference between a time of spouting the first ink droplet and a start time of the first signal of the second driving pulse to be longer than a recovery time TR of a meniscus after the spout of the first ink droplet and shorter than TR+3·Tm/8 where Tm denotes a period of a natural vibration of the meniscus.

14. A printing apparatus in accordance with claim 12, wherein a pressure chamber having a volume reduced by deformation of said pressure generating element to increase a liquid pressure of ink is disposed in connection with an ink conduit that is connected to said nozzle, and wherein said driving signal generation unit sets a time difference between a time of spouting the first ink droplet and a time of spouting the second ink droplet as proportionate to a period Tc of a Helmholtz resonance vibration of the ink in said pressure chamber.

* * * * *